United States Patent
Yamada

(10) Patent No.: US 8,154,229 B2
(45) Date of Patent: *Apr. 10, 2012

(54) CONTROL SYSTEM FOR MULTIPHASE ROTARY MACHINES

(75) Inventor: Takahiro Yamada, Nagoya (JP)

(73) Assignee: Denso Corporation, Kariya (JP)

(*) Notice: Subject to any disclaimer, the term of this patent is extended or adjusted under 35 U.S.C. 154(b) by 649 days.

This patent is subject to a terminal disclaimer.

(21) Appl. No.: 12/336,684

(22) Filed: Dec. 17, 2008

(65) Prior Publication Data
US 2009/0160376 A1  Jun. 25, 2009

(30) Foreign Application Priority Data
Dec. 19, 2007 (JP) .................................. 2007-327021

(51) Int. Cl.
*H02P 6/00* (2006.01)
(52) U.S. Cl. .............................. 318/400.01; 318/400.02
(58) Field of Classification Search ............. 318/400.01, 318/400.02, 432, 434, 798
See application file for complete search history.

(56) References Cited

U.S. PATENT DOCUMENTS

| | | | |
|---|---|---|---|
| 5,416,686 A * | 5/1995 | Azuma et al. | 363/37 |
| 5,448,149 A * | 9/1995 | Ehsani et al. | 318/701 |
| 5,659,235 A * | 8/1997 | Yamada et al. | 318/801 |
| 5,877,607 A * | 3/1999 | Masaki et al. | 318/807 |
| 6,555,988 B2 * | 4/2003 | Masaki et al. | 318/721 |

FOREIGN PATENT DOCUMENTS

| JP | 61-288796 | 12/1986 |
|---|---|---|
| JP | 2003-235-235270 | 8/2003 |
| JP | 2003-235270 | 8/2003 |

OTHER PUBLICATIONS

Japanese Office Action dated Dec. 1, 2009, issued in corresponding Japanese Application No. 2007-327021, with English translation.

* cited by examiner

*Primary Examiner* — Rina Duda
(74) *Attorney, Agent, or Firm* — Nixon & Vanderhye P.C.

(57) ABSTRACT

In a control system designed to use a plurality of voltage vectors expressing a switching mode for a switching circuit to thereby control a difference between a current actually flowing through a multiphase rotary machine and a command current value therefore within an allowable range, a calculating unit calculates a direction of change in the difference during the switching mode for the switching circuit being set to a zero vector. A zero-vector setting unit sets the switching mode for the switching circuit to the zero vector when a preset positional condition between the difference and the direction of change in the difference is met in a space.

23 Claims, 22 Drawing Sheets

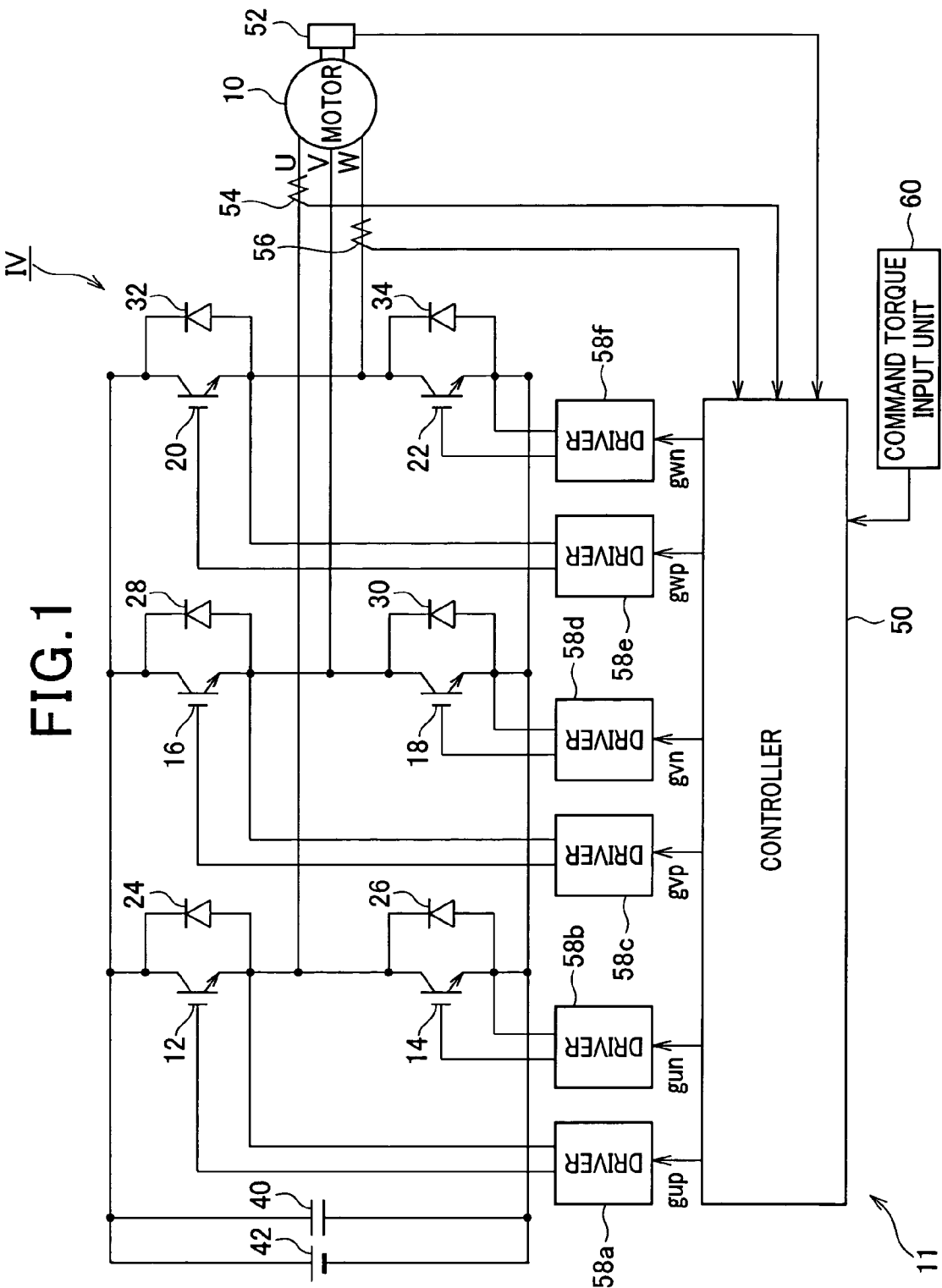

| VOLTAGE VECTOR | ON-STATE OF SWITCHING ELEMENT | | |
|---|---|---|---|
| | U-PHASE | V-PHASE | W-PHASE |
| V0 | L | L | L |
| V1 | L | L | H |
| V2 | L | H | L |
| V3 | L | H | H |
| V4 | H | L | L |
| V5 | H | L | H |
| V6 | H | H | L |
| V7 | H | H | H |

FIG.12

Vc CONTAINING REGION

| FIRST SWITCHING VECTOR Sv1 | R1 | R2 | R3 | R4 | R5 | R6 | ~M3 |
|---|---|---|---|---|---|---|---|
| V1 | V0 | V0 | V0 | V3 | V5 | V0 | |
| V2 | V0 | V6 | V3 | V0 | V0 | V0 | |
| V3 | V0 | V0 | V2 | V1 | V0 | V0 | |
| V4 | V6 | V0 | V0 | V0 | V0 | V5 | |
| V5 | V0 | V0 | V0 | V0 | V1 | V4 | |
| V6 | V4 | V2 | V0 | V0 | V0 | V0 | |

SECOND SWITCHING VECTOR Sv2
SELECTING TABLE

FIG.16

Vc CONTAINING REGION →

|  | R1 | R2 | R3 | R4 | R5 | R6 |
|---|---|---|---|---|---|---|
| R1 | 0 | 0 | 0 | 1 | 0 | 0 |
| R2 | 0 | 0 | 0 | 0 | 1 | 0 |
| R3 | 0 | 0 | 0 | 0 | 0 | 1 |
| R4 | 1 | 0 | 0 | 0 | 0 | 0 |
| R5 | 0 | 1 | 0 | 0 | 0 | 0 |
| R6 | 0 | 0 | 1 | 0 | 0 | 0 |

ΔI CONTAINING REGION ↓

~M4

CONTROL SYSTEM FOR MULTIPHASE ROTARY MACHINES

CROSS REFERENCE TO RELATED APPLICATIONS

This application is based on Japanese Patent Application 2007-327021 filed on Dec. 19, 2007. This application claims the benefit of priority from the Japanese Patent Application, so that the descriptions of which are all incorporated herein by reference.

FIELD OF THE INVENTION

The present invention relates to control systems for multiphase rotary machines. More particularly, such control systems are designed to drive a switching circuit to thereby control the difference between a value of a current actually flowing in a multiphase rotary machine and a command value for the current such that the difference remains within a preset allowable range.

BACKGROUND OF THE INVENTION

An example of such control systems for controlling the difference between a value of a current actually flowing in a multiphase rotary machine and a command value for the current such that the difference remains within a preset allowable range is disclosed in Japanese Patent Application Publication No. 2003-235270.

A control system disclosed in the Japanese Patent Application Publication is designed to drive the plurality of switching elements of a switching circuit serving as a power converter in a non-zero vector mode to thereby bring, to nearly zero, the difference between a value of a current actually flowing through each phase winding of a multiphase rotary machine and a command current value for a corresponding one of the phase windings. After the current difference is brought to nearly zero, the control system is designed to drive the plurality of switching elements in a zero vector mode.

The control system in the zero vector mode works to drive the plurality of switching elements such that line-to-line voltages between the phase windings are all zero. Note that the switching mode for the plurality of switching elements is expressed by voltage vectors. The voltage vectors in which the line-to-line voltages between the phase windings are all zero will be referred to as "zero vectors" hereinafter.

The control system in the non-zero vector mode works to drive the plurality of switching elements such that at least one of the line-to-line voltages between the phase windings are not zero. The voltage vectors in which at least one of the line-to-line voltages between the phase windings are not zero will be referred to as "non-zero vectors" hereinafter.

The configuration of the control system disclosed in the Japanese Patent Application Publication increases durations of the zero vectors to thereby reduce current ripples in the current for each phase winding at the same switching frequency for the plurality of switching elements.

SUMMARY OF THE INVENTION

The inventors of the present application have found that:
the drive of the plurality of switching elements by the control system disclosed in the Japanese Patent Application Publication during a low RPM of the multiphase rotary machine reduces the percentage of the durations in which the switching circuit is driven in the zero vector mode as compared with the drive of the plurality of switching elements of the switching circuit in a well-known triangular PWM control mode.

For this reason, either the switching frequency for the plurality of switching elements or higher harmonic waves may increase.

In addition, the control system disclosed in the Japanese Patent Application Publication is configured to:

drive the plurality of switching elements of the switching circuit in the non zero-vector mode to thereby bring, to nearly zero, the difference between a value of a current actually flowing through each phase winding and a command current value for a corresponding one of the phase windings when it is determined that the difference is out of the preset allowable range; and drive the plurality of switching elements in the zero vector mode after the difference becomes nearly zero.

For this reason, periods during which a value of the current actually flowing through each phase winding of the multiphase rotary machine is deviated higher or lower from the command current value may be extended. This may result in reducing the control accuracy of torque to be created by the multiphase rotary machine.

In view of the background, an object of at least one aspect of the present invention is to provide control systems for a multiphase rotary machine. These control systems are capable of driving a switching circuit so as to control the difference between a value of a current actually flowing in the multiphase rotary machine and a command current value within an allowable range while more properly increasing durations in which the switching circuit is driven in the zero vector mode.

According to one aspect of the present invention, there is provided a control system designed to use a plurality of voltage vectors expressing a switching mode for a switching circuit to thereby control a difference between a current actually flowing in a multiphase rotary machine and a command current value therefor within an allowable range. The plurality of voltage vectors include a zero vector that allows line-to-line voltages in the multiphase rotary machine to be all zero, and a plurality of non-zero vectors that allow at least one of line-to-line voltage in the multiphase rotary machine to be nonzero. The plurality of non-zero vectors define a plurality of separated regions in a space around a center point at which the difference is zero. The control system includes a calculating unit configured to calculate a direction of change in the difference during the switching mode for the switching circuit being set to the zero vector. The control system also includes a zero-vector setting unit configured to set the switching mode for the switching circuit to the zero vector when a preset positional condition between the difference and the direction of change in the difference is met in the space.

BRIEF DESCRIPTION OF THE DRAWINGS

Other objects and aspects of the invention will become apparent from the following description of embodiments with reference to the accompanying drawings in which:

FIG. 1 is a circuit diagram of a control system for a motor according to a first embodiment of the present invention;

FIG. 12 is a view schematically illustrating a map that has stored therein data indicative of a relationship between a variable of a second switching vector, a variable of a selected first switching vector, and a variable of a region in which the change vector is located according to the first embodiment;

FIG. 16 is a view schematically illustrating a map that has stored therein data indicative of a relationship between a variable of the zero-vector output region, a variable of a region in which the change vector is located, and a variable of a region in which the difference current vector ΔI is located.

DETAILED DESCRIPTION OF EMBODIMENTS OF THE INVENTION

Figures 2A, 2B:
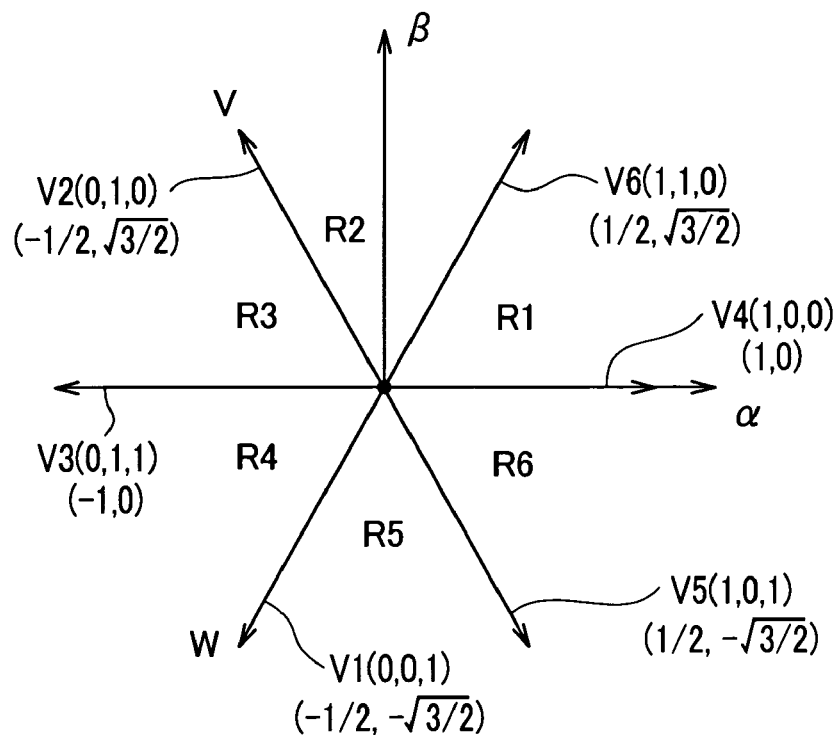
FIG. 2A is a vector diagram schematically illustrating six non-zero voltage vectors in an $\alpha$ and $\beta$ coordinate space according to the first embodiment.
FIG. 2B is a table schematically illustrating eight on-off switching states corresponding to eight voltage vectors according to the first embodiment.

Embodiments of the present invention will be described hereinafter with reference to the accompanying drawings. In each embodiment, the present invention is, for example, applied to a control system for a three-phase brushless motor installed in a hybrid vehicle; this three-phase brushless motor is an example of various types of multiphase rotary electric machines.

First Embodiment

Referring to the drawings, particularly to FIG. 1, there is illustrated a three-phase brushless motor, referred to simply as "motor", 10 and a control system 11 for controlling the motor 10.

For example, the motor 10 is provided with an annular rotor having a rotor core. The rotor core of the rotor is provided at its circumferential portion with at least one N and S pole pair. The rotor has a direct axis (d-axis) in line with a rotor N pole center line, and has a quadrature axis (q-axis) whose phase is π/2 radian electric angle leading with respect to a corresponding d-axis during rotation of the rotor.

The stator includes a stator core with, for example, an annular shape in its lateral cross section. The stator core is for example disposed around the outer periphery of the rotor core such that the inner periphery of the stator core is opposite to the outer periphery of the rotor core with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-phase winding, V-phase winding, and W-phase winding are shifted by an electrical angular position of, for example, 2π/3 radian in phase from each other.

The motor 10 is operative to receive at its three-phase windings three-phase currents to thereby generate a rotating magnetic flux; this allows the rotor to turn based on magnetic attractive force between the rotating magnetic flux and a magnetic flux of the rotor.

One ends of the U-, V-, and W-phase windings are connected to each other in, for example, star configuration to constitute an individual neutral point.

On the other hand, the control system 11 includes an inverter IV.

The inverter IV is designed as a three-phase inverter. The inverter IV includes a first pair of series-connected switching elements 12 and 14 for the U-phase winding, a second pair of series-connected switching elements 16 and 18 for the V-phase winding, and a third pair of series-connected switching elements 20 and 22 for the W-phase winding. The inverter IV also includes flywheel diodes 24, 26, 28, 30, 32, and 34 connected in antiparallel with the switching elements 12, 14, 16, 18, 20, and 22, respectively.

In the first embodiment, as the switching elements, IGBTs are used.

The cathode of each of the flywheel diodes 24, 26, 28, 30, 32, and 34 is connected with one output terminal, such as collector, of a corresponding one of the switching elements, and the anode thereof is connected with the other output terminal, such as emitter, of a corresponding one of the switching elements.

The first to third pairs of switching elements are parallely connected with each other in bridge configuration.

A connecting point through which the switching elements 12 and 14 of the first pair are connected with each other in series is connected with an output lead extending from the other end of the U-phase winding. Similarly, a connecting point through which the switching elements 16 and 18 of the second pair are connected with each other in series is connected with an output lead extending from the other end of the V-phase winding. Moreover, a connecting point through which the switching elements 20 and 22 of the third pair are connected with each other in series is connected with an output lead extending from the other end of the W-phase winding.

The control system 11 includes a smoothing capacitor 40 and a battery 42.

One end of the series-connected switching elements 12 and 14 of the first pair, such as the collector of the switching element 12, is connected with a positive terminal of the battery 42, and the other end thereof, such as the emitter of the second switching element 14, is connected with a negative terminal of the battery 42.

Similarly, one end of the series-connected switching elements 16 and 18 of the second pair is connected with the positive terminal of the battery 42, and the other end thereof is connected with the negative terminal of the battery 42. Moreover, one end of the series-connected switching elements 20 and 22 of the third pair is connected with the positive terminal of the battery 42, and the other end thereof is connected with the negative terminal of the battery 42.

In other words, the battery 42 is parallely connected with the first, second, and third pairs of switching elements. The smoothing capacitor is parallely connected with the battery 42.

The control system 11 includes a controller 50, drivers 58a, 58b, 58c, 58d, 58e, and 58f, a position sensor, such as a rotary encoder, 52, current sensors 54 and 56, and a command torque input unit 60.

The position sensor 52 is operative to measure a rotational angular position of an output shaft of the motor 10 as an electric angle, and to send, to the controller 50, a measured rotational angular position as feedback information.

The current sensor 54 is arranged to measure a value of a U-phase current actually flowing through the U-phase winding and to send, to the controller 50, a measured current value as feedback information. Similarly, the current sensor 56 is arranged to measure a value of a W-phase current actually flowing through the W-phase winding and to send, to the controller 50, a measured current value as feedback information.

The connecting configuration between the inverter IV and the battery 42 allows an output voltage of the battery 42 to be applied, via the smoothing capacitor 40, across:

both ends of the first paired series-connected switching elements 12 and 14;
both ends of the second paired series-connected switching elements 16 and 18; and
both ends of the third paired series-connected switching elements 20 and 22.

The command torque input unit 60 is operative to input, to the controller 50, a command value of torque requested by, for example, the driver of the hybrid vehicle.

The controller 50 is for example designed as a common microcomputer circuit consisting of a CPU, an I/O interface, a memory unit, and other peripheries.

Each of the switching elements 12, 14, 16, 18, 20, and 22 has a control terminal, such as gate, connected with the drivers 58a, 58b, 58c, 58d, 58e, and 58f, respectively. The drivers 58a, 58b, 58c, 58d, 58e, and 58f are connected with the controller 50.

Based on the rotational angular position of the output shaft of the motor 10, the measured current value of each phase current, and the command torque value, the controller 50 is operative to cause the drivers 58a, 58b, 58c, 58d, 58e, and 58f to individually drive on and off the switching elements 12, 14, 16, 18, 20, and 22.

Specifically, the controller 50 is operative to cause the driver 58a to supply a drive signal gup to the switching element 12 to thereby turn on and off it, and the driver 58b to supply a drive signal gun to the switching element 14 to thereby turn on and off it. The controller 50 is operative to cause the driver 58c to supply a drive signal gvp to the switching element 16 to thereby turn on and off it, and the driver 58d to supply a drive signal gvn to the switching element 18 to thereby turn on and off it. The controller 50 is operative to cause the driver 58e to supply a drive signal gwp to the switching element 20 to thereby turn on and off it, and the driver 58f to supply a drive signal gwn to the switching element 22 to thereby turn on and off it.

The driving modes for the switching elements 12, 14, 16, 18, 20, and 22 of the inverter IV will be described hereinafter with reference to FIGS. 2A and 2B.

FIG. 2A schematically illustrate voltage vectors in an α and β stationary coordinate space defined in the stator of the motor 10. In the first embodiment, an α axis of the stationary coordinate space is defined to coincide with a direction of the U-phase current in phase, and a β axis is defined to be orthogonal to the α axis.

The voltage vectors include zero vectors and non-zero vectors. The zero vectors V0 and V7 cause the line-to-line voltages between the phase windings to be all zero, and the non-zero vectors V1 to V6 cause at least one of the line-to-line voltages between the phase windings not to be zero.

The voltage vectors V0 to 17 represents the drive modes of the inverter IV. Specifically, when the voltage vectors are expressed by coordinates (u, v, w) in a three-phase coordinate system defined in the stator of the motor 10, on-state of the high-side (upper-arm) switching elements 12, 16, and 20 is expressed by "1", and on-state of the low-side (lower-arm) switching elements 14, 18, and 22 is expressed by "0". Each of the non-zero voltage vectors V1 to V6 is expressed such that at least one of the coordinates is "1" and at least another one of the coordinates is "0". These expressions of the non-zero voltage vectors are based on the fact that the upper-arm switching element and the lower-arm switching element of the same phase are driven so as not to be simultaneously in on state.

FIG. 2B schematically illustrates a relationship between each of the voltage vectors V0 to V7 and a corresponding one of the switching elements 12, 14, 16, 18, 20, and 22.

In FIG. 2B, for example, reference character "H" represents that a corresponding high-side switching element is on state, and reference character "L" represents that a corresponding low-side switching element is on state.

For example, the voltage vector V (L, L, H) represents that the switching element 14 in on state, the switching element 18 is on state, and the switching element 22 is on state. In other words, the controller 50 drives the inverter IV in the non-zero vector V1 mode with the voltage vector V1 to thereby control the switching element 14 in on state, the switching element 18 is on state, and the switching element 22 is on state.

The voltage vector V0 represents that all of the low-side switching elements 14, 18, and 22 are on state. In other words, the controller 50 drives the inverter IV in the mode of the non-zero vector V0 to thereby control all of the switching elements 14 18, and 22 in on state.

The voltage vector V7 represents that all of the high-side switching elements 12, 16, and 20 are on state. In other words, the controller 50 drives the inverter IV in the non-zero vector V7 mode to thereby control all of the switching elements 12 16, and 20 in on state.

In FIG. 2A, the components of each of the voltage vectors are converted by well-known three-phase to two-phase conversion into components in the α and β stationary coordinate system. The six non-zero vectors V1 to V6 define six separated regions R1 to R6 in the α and β stationary coordinate space The three-phase to two-phase conversion allows currents actually flowing in the motor 10 and command current values therefor to be expressed in the α and β coordinate space. This means that the difference between a value of each current actually flowing in the motor 10 and a command current value for a corresponding current can be expressed in the α and β coordinate space.

Specifically, in the first embodiment, command current values for U-, V-, and W-phase currents actually flowing in the motor 10 and expressed in the three-phase coordinate space can be expressed in the α and β coordinate space as command current values iαc and iβc. Values of the U-, V-, and W-phase currents actually flowing in the motor 10 and expressed in the three-phase coordinate system can be expressed in the α and β coordinate space as actual current values iα and iβ.

In the first embodiment, the controller 50 is programmed to individually drive the switching elements 12, 14, 16, 18, 20, and 22 to thereby remain, within a preset allowable range, a difference value vector ΔI calculated by subtracting the actual current values iα and iβ from the respective command current values iαc and iβc. The difference value vector has coordinates (iαc-iα, iβc-iβ) in the α and β coordinate space.

In addition, the allowable range is defined as a circular range with a preset radius H around a center point at which the difference value vector ΔI is zero.

Next, the current control principles according to the first embodiment will be described hereinafter.

First, an equation indicative of the behavior of the difference value vector ΔI in the α and β coordinate space is derived.

Specifically, assuming that an actual current vector actually flowing in the motor 10 in the α and β coordinate space is expressed by I having coordinates (iα, iβ) and the voltage vectors V0 to V7 are represented by Vk (k=0 to 7), the behavior of the actual current vector I is represented by the following voltage equation [c1] in vector format:

$$Vk = L \cdot (dI/dt) + R \cdot I + E \qquad [c1]$$

where L and R represent an inductance and a resistance of the motor 10 in the α and β coordinate space, respectively, and E represents an induced voltage vector in the α and β coordinate space.

In addition, assuming that a command current vector having coordinates (iαc, iβc) is expressed by Ic, the following equation [c2] is established based on the definition of the difference value vector ΔI:

$$L \cdot (d\Delta I/d\Delta t) = L \cdot (d(Ic-I) \cdot dt) \qquad [c2]$$
$$= L \cdot (dIc/dt) - L - (dI/dt)$$

Deformation of the equation [c2] obtains the following equation [c3]:

$$L \cdot (dI/dt) = L \cdot (dIc/dt) - L \cdot (d\Delta I/dt) \qquad [c3]$$

Elimination of the time derivative term of the actual current vector I from the equation [c1] using the equation [c3] and thereafter deformation of the equation [c1] obtains the following equation [c4]:

$$L \cdot (d\Delta I/dt) = L \cdot (dIc/dt) + R \cdot I + E - Vk \qquad [c4]$$

Elimination of the actual current vector I from the equation [c4] using the definition of the definition of the difference value vector ΔI obtains the following equation [c5]:

$$L \cdot (d\Delta I/dt) = L \cdot (dIc/dt) + R \cdot Ic + E - Vk - R \cdot \Delta I \qquad [c5]$$

Assuming that a voltage vector Vc is defined as follows:

$$Vc = L \cdot (dIc/dt) + R \cdot Ic + E - R - \Delta I$$

the equation [c5] is deformed as the following equation [c6]:

$$L \cdot (d\Delta I/dt) = Vc - Vk \qquad [c6]$$

The equation [c6] allows change in the difference value vector ΔI to be represented by the difference between two vectors.

Particularly, when the voltage vector Vk is one of the zero vectors, the direction of the change in the difference value vector ΔI is represented by the single vector Vc and therefore, the vector Vc will be referred to as "change vector Vc".

The change vector Vc has a starting point at which the difference value vector ΔI is zero, and represents the direction of the change in the difference value vector ΔI predicted when the inverter IV is driven in the zero vector mode.

Note that, if the term of "R·ΔI" in the equation [c5] is negligible during the inverter IV is driven in the zero vector mode, the change vector Vc can be equal to the right side in the equation [c1] when the actual current vector I is replaced with the command current vector Ic. For this reason, the change vector Vc can be regarded as a command voltage vector.

As described above, drive of the inverter IV in the zero vector mode allows the difference value vector ΔI to vary depending on the change vector Vc. For this reason, when the change vector Vc is located in a region of the α and β coordinate space, the difference value vector ΔI is so controlled as to be located in an alternative region of the α and β coordinate space; the opposite direction of this change vector Vc passes through the alternative region.

After the difference value vector ΔI is located in the alternative region of the α and β coordinate space, the inverter IV is controlled to be driven in the zero vector mode. This makes possible that the difference value vector ΔI has remaining within the allowable range for a long period since the start of the drive of the inverter IV in the zero vector mode. In other words, this probably increases durations of the zero vectors.

Figure 3:
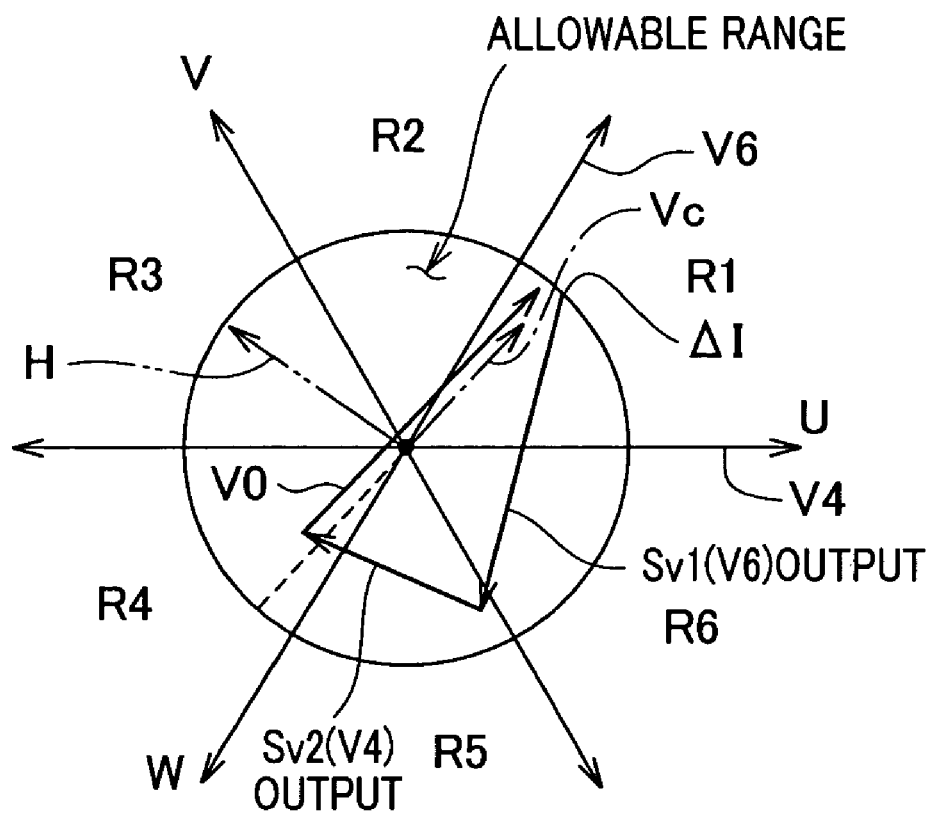
FIG. 3 is a vector diagram schematically illustrating a steady-state control method for currents to be supplied to the motor in view of current control principles according to the first embodiment.

FIG. 3 schematically illustrates the steady-state control method for the currents to be supplied to the motor 10 in view of the aforementioned current control principles. Specifically, FIG. 3 illustrates a steady-state switching pattern of the inverter IV according to the first embodiment.

In FIG. 3, it is assumed that the change vector Vc and the difference value vector ΔI are located in the region R1 with the difference value vector ΔI being out of an allowable range.

In this situation, the difference value vector ΔI is controlled to be located in the region R4 through which the opposite direction of this change vector Vc passes, and thereafter, the inverter IV is controlled to be driven in the zero vector mode. For example, the allowable range has a circled boundary in the α and β coordinate space and is symmetrical about the origin of the α and β coordinate space corresponding to the center point of the circled allowable range.

Specifically, a voltage vector that is the closest to the different current vector ΔI in the α and β coordinate space will be referred to as "first switching vector Sv1". Moreover, a pair of voltage vectors that define the region R1 in which the change vector Vc is located is selected, and one of the selected voltage vectors that is other than the first switching vector Sv1 is further selected as "second switching vector Sv2". In FIG. 3, the voltage vector V6 is referred to as the first switching vector Sv1, and the voltage vector V4 is referred to as the second switching vector Sv2. The drive mode for the inverter IV is switched in the following order.

First, the inverter IV is controlled to be driven in the mode of the first switching vector Sv1 in step (a). This allows the different current vector ΔI to change in the direction of a differential vector obtained by subtracting the first switching vector Sv1 from the change vector Vc (see the equation [c6] and "Sv1 (V6) OUTPUT" in FIG. 3).

Second, when there are two times of region shift of the different current vector ΔI in the α and β coordinate space, the inverter IV is controlled to be driven in the mode of the second switching vector Sv2 in step (b). That is, in FIG. 3, when the different current vector ΔI is shifted from the region R6 to the region R5, the drive mode for the inverter IV is shifted from the mode of the first switching vector Sv1 to the mode of the second switching vector Sv2 in step (b).

This allows the different current vector IA to change in a direction of a differential vector obtained by subtracting the second switching vector Sv2 from the change vector Vc (see the equation [c6]).

Third, when the different current vector ΔI crosses a line, which is parallel to or contained in the change vector Vc and passes thorough a point at which the different current vector ΔI is zero, the drive mode for the inverter IV is shifted from the mode of the second switching vector Sv2 to the zero vector mode of one of the zero vectors V0 and V7 in step (c). The point at which the different current vector ΔI is zero will be referred to as "zero point" hereinafter.

This allows the different current vector ΔI to temporarily decrease until the zero point and thereafter increase. Thus, it is possible to increase the duration of the different current vector ΔI remaining within the allowable range. In addition, because the different current vector ΔI is controlled to pass through its zero point, it is possible to set the actual current vector Ito be higher than the command current vector Ic and lower than it without deviating, for a long period, the actual current vector I from the command current vector Ic to only the higher side or lower side. This increases the accuracy of controlling the torque to be created by the motor 10.

With the switching pattern, when the different current vector ΔI changes so as to be located in the region R1 and out of the allowable range based on the drive of the inverter IV in the zero vector mode, the different current vector ΔI returns to a situation before step (a) is executed. Thus, it is possible to repeat steps (a) to (c) unless the direction of the change vector Vc changes.

Particularly, execution of the control method set forth above efficiently increases the durations of the inverter IV being driven in the zero vector mode with the different current vector ΔI remaining within the allowable range.

In the first embodiment, the change vector Vc is calculated (expected) based on the change in the different current vector ΔI during the switching mode for the inverter IV being set to a zero vector. This allows the change vector Vc to be calculated every time the step (c) is carried out.

Processes to be executed by the controller 50 based on the current control principles set forth above will be described in more detail hereinafter.

Figure 4:
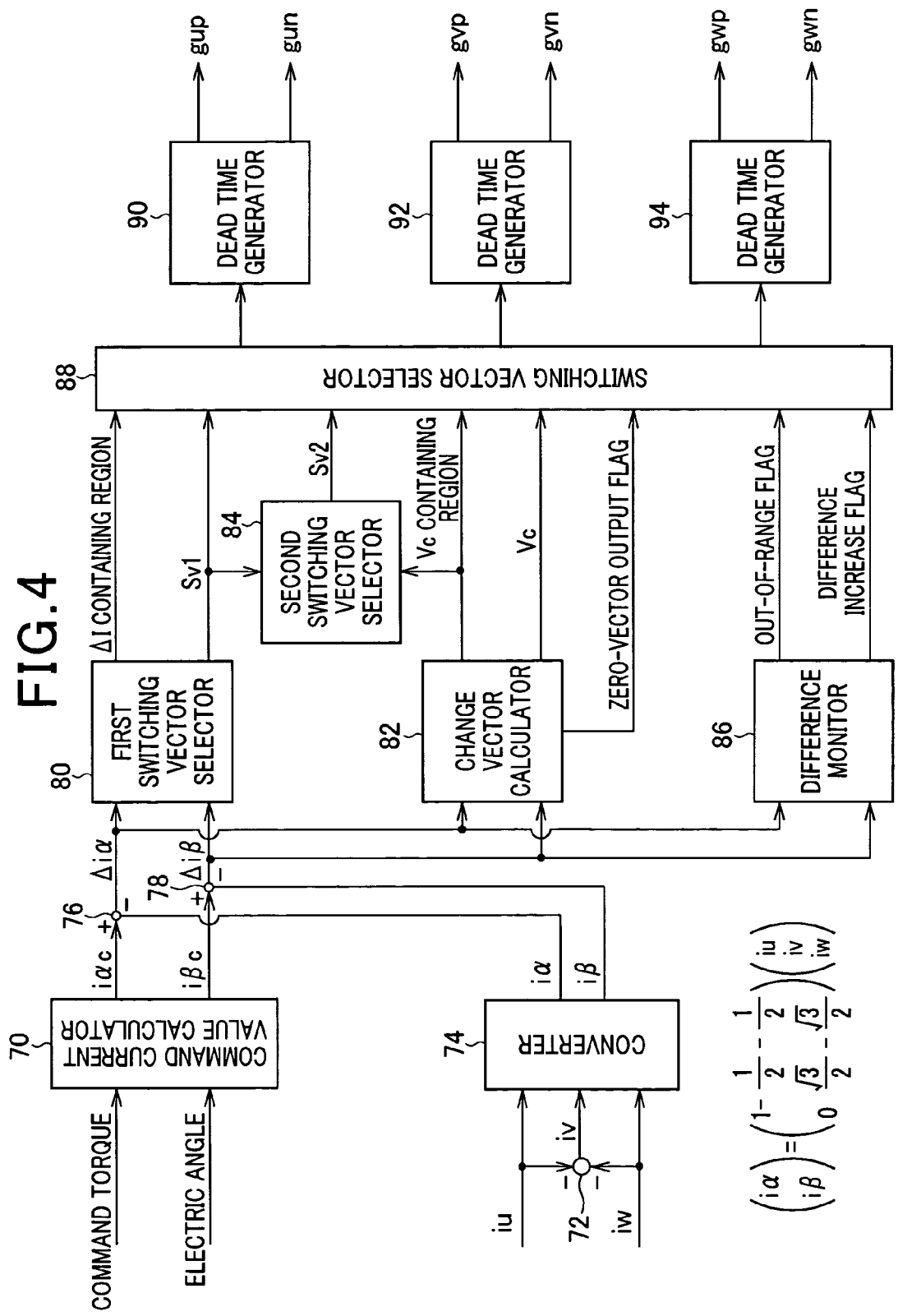
FIG. 4 is a block diagram schematically illustrating functional modules of a controller illustrated in FIG. 1 according to the first embodiment.

FIG. 4 schematically illustrates functional modules of the controller 50 equivalent to the processes to be executed thereby.

The controller 50 includes a command current value calculator 70, a subtractor 72, a three-phase to two-phase converter 74, a first switching vector selector 80, a change vector calculator 82, a second switching vector selector 84, a difference monitor 86, a switching vector selector 88, and three dead time generators 90, 92, and 94.

Note that the functional modules can be implemented by one or more program modules installed in the microcomputer of the controller 50 or can be implemented by one or more hardwired-logic circuits installed therein.

The command current value calculator 70 works to calculate command current values iαc and iβc in the α and β coordinate space based on the command torque inputted from the torque input unit 60 and the measured angular position (electric angle) sent from the position sensor 52.

Figure 5:
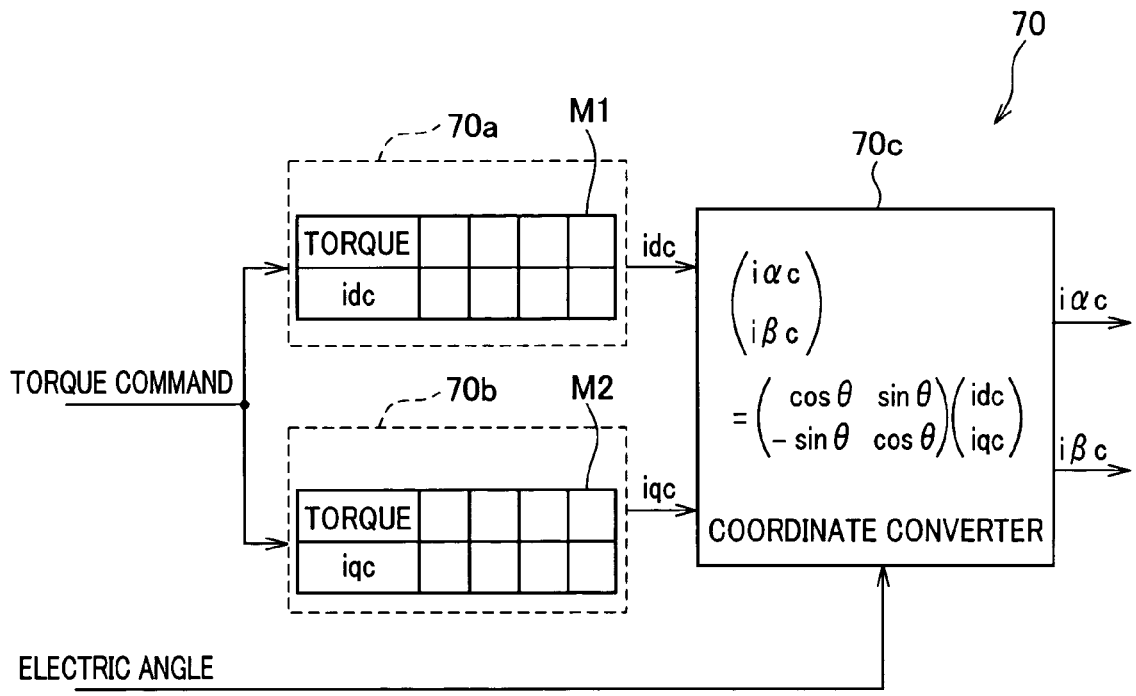
FIG. 5 is a block diagram schematically illustrating a command current value calculator illustrated in FIG. 4.

Specifically, referring to FIG. 5, the command current value calculator 70 includes a d-axis command value calculator 70a, a q-axis command value calculator 70b, and a coordinate converter 70c.

The d-axis command value calculator 70a works to calculate a command value idc on the d-axis based on a map M1 stored therein. The map M1 has stored therein data indicative of a relationship between a variable of the measured command torque and a variable of the d-axis command value idc.

Similarly, the q-axis command value calculator 70b works to calculate a command value iqc on the q-axis based on a map M2 stored therein. The map M2 has stored therein data indicative of a relationship between a variable of the measured command torque and a variable of the q-axis command value iqc.

In the first embodiment, each of the maps M1 and M2 is composed of, for example, a function formula, a data table, and/or a program. Each of the maps M1 and M2 is adapted to meet the following equation [c7] indicative of the torque command value (τ):

$$\tau = p\{Tk \cdot iqc - (Ld - Lq) \cdot idc \cdot iqc\} \qquad \text{c[7]}$$

where p represents the number of pole pairs, and Tk represents a torque constant.

The coordinate converter 70c works to convert the d-axis command value idc and q-axis command value iqc into command current values iαc and iβc in the α and β coordinate space in accordance with the following equation [c8]:

$$\begin{pmatrix} i\alpha c \\ i\beta c \end{pmatrix} = \begin{pmatrix} \cos\theta & \sin\theta \\ -\sin\theta & \cos\theta \end{pmatrix} \begin{pmatrix} idc \\ iqc \end{pmatrix} \qquad [c8]$$

where θ represents the measured angular position corresponding to an angle of the d-axis and q-axis defined in the rotor with respect to the α and β coordinate system.

An actual U-phase current value iu flowing through the U-phase winding is measured by the current sensor 54, and an actual W-phase current value iw flowing through the W-phase winding is measured by the current sensor 56.

The subtractor 72 works to calculate a V-phase actual current value iv actually flowing through the V-phase winding, using the Kirchhoff's law, based on the measured actual U-phase current value iu and on the measured actual W-phase current value iw.

The three-phase to two-phase converter 74 works to convert the three-phase actual current values iu, iv, and iw into actual current values iα and iβ in the α and β coordinate space in accordance with the well-known three-phase to two-phase conversion used for expressing the voltage vectors in the α and β coordinate space and represented by the following equation [c9]:

$$\begin{pmatrix} i\alpha \\ i\beta \end{pmatrix} = \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} iu \\ iv \\ iw \end{pmatrix}$$ [c9]

The subtractor 76 works to subtract the actual current value iα from the command current values iαc on the α axis to thereby calculate an α-axis difference value iαc-iα. Similarly, the subtractor 78 works to subtract the actual current value iβ from the command current values iβc on the β axis to thereby calculate an β-axis difference value iβc-iβ. Thus, the difference value vector ΔI(iαc-iα, iβc-iβ) is calculated.

The difference value vector ΔI is inputted to each of the first switching vector selector 80, the change direction calculator 82, and the difference monitor 86.

The first switch vector selector 80 works to select a voltage vector that is the closest to the different current vector ΔI in the α and β coordinate space as the first switching vector Sv1 and identify a region in the α and β coordinate space in which the difference value vector ΔI is located.

The change vector calculator 82 works to calculate the change vector Vc based on the different current vector ΔI and identify a region in the α and β coordinate space in which the change vector Vc is located.

The difference monitor 86 works to monitor the difference current vector ΔI to determine whether the difference current vector ΔI remains within the allowable range and determine whether the difference current vector ΔI increases.

The second switch vector selector 84 works to select voltage vectors that define the identified region in which the change vector Vc is located, and select, as the second switching vector Sv2, one of the selected voltages that is other than the first switching vector Sv1.

The switching vector selector 88 works to generate a signal to determine the switching state of the inverter IV for each phase winding, and to output the generated signal for each phase winding to a corresponding one of the dead time generators 90, 92, and 94.

The dead time generator 90 works to generate the drive signals gup and gun based on the signal for the U-phase winding outputted from the switching vector selector 88, and output the drive signals gup and gun to the drivers 58a and 58b, respectively. The dead time generator 92 works to generate the drive signals gvp and gvn based on the signal for the V-phase winding outputted from the switching vector selector 88, and output the drive signals gvp and gvn to the drivers 58c and 58d, respectively. The dead time generator 94 works to generate the drive signals gwp and gwn based on the signal for the W-phase winding outputted from the switching vector selector 88, and output the drive signals gwp and gwn to the drivers 58e and 58f, respectively.

Next, operations of the first switching vector selector 80, operations of the change vector calculator 82, operations of the second switching vector selector 84, and operations of the difference monitor 86 will be described in detail hereinafter, and thereafter, operations of the switching vector selector 88 will be described in detail hereinafter.

First, operations of the first switching vector selector 80 for selecting the first switching vector Sv1 will be described hereinafter.

Figure 6:
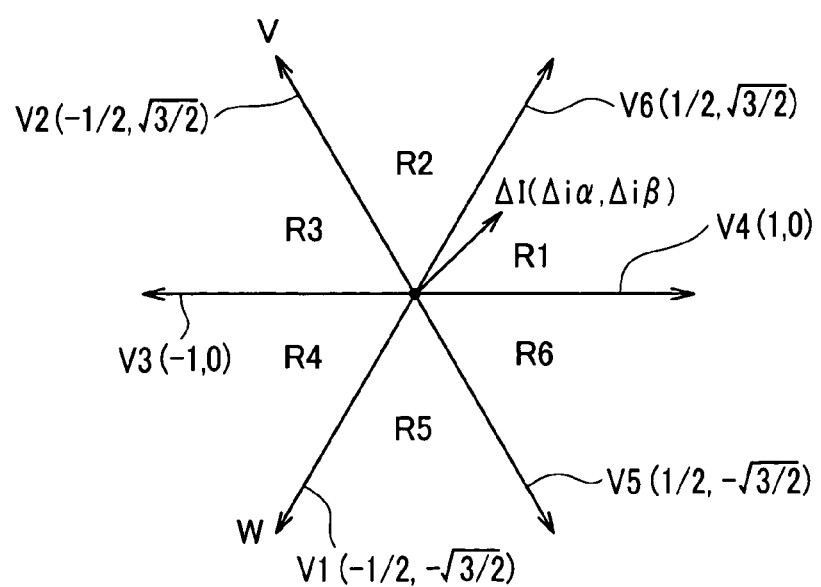
FIG. 6 is a vector diagram schematically illustrating a different 16 current vector in the α and β coordinate space according to the first embodiment.

When the different current vector ΔI is given (see FIG. 6 as an example), the first switching vector selector 80 selects a non-zero vector, such as the non-zero vector V6 in FIG. 6, which is the different current vector ΔI in the α and β coordinate space as the first switching vector Sv1. Specifically, the first switching vector selector 80 narrows a search to two non-zero vectors that may be the closest to the different current vector ΔI based on the sings of the respective components of the different current vector ΔI. Thereafter, the first switching vector selector 80 computes the inner product of the different current vector ΔI and each of the two non-zero vectors to thereby identify one of the two non-zero vectors that is the closest to the different current vector ΔI based on a result of the inner product.

Figure 7:
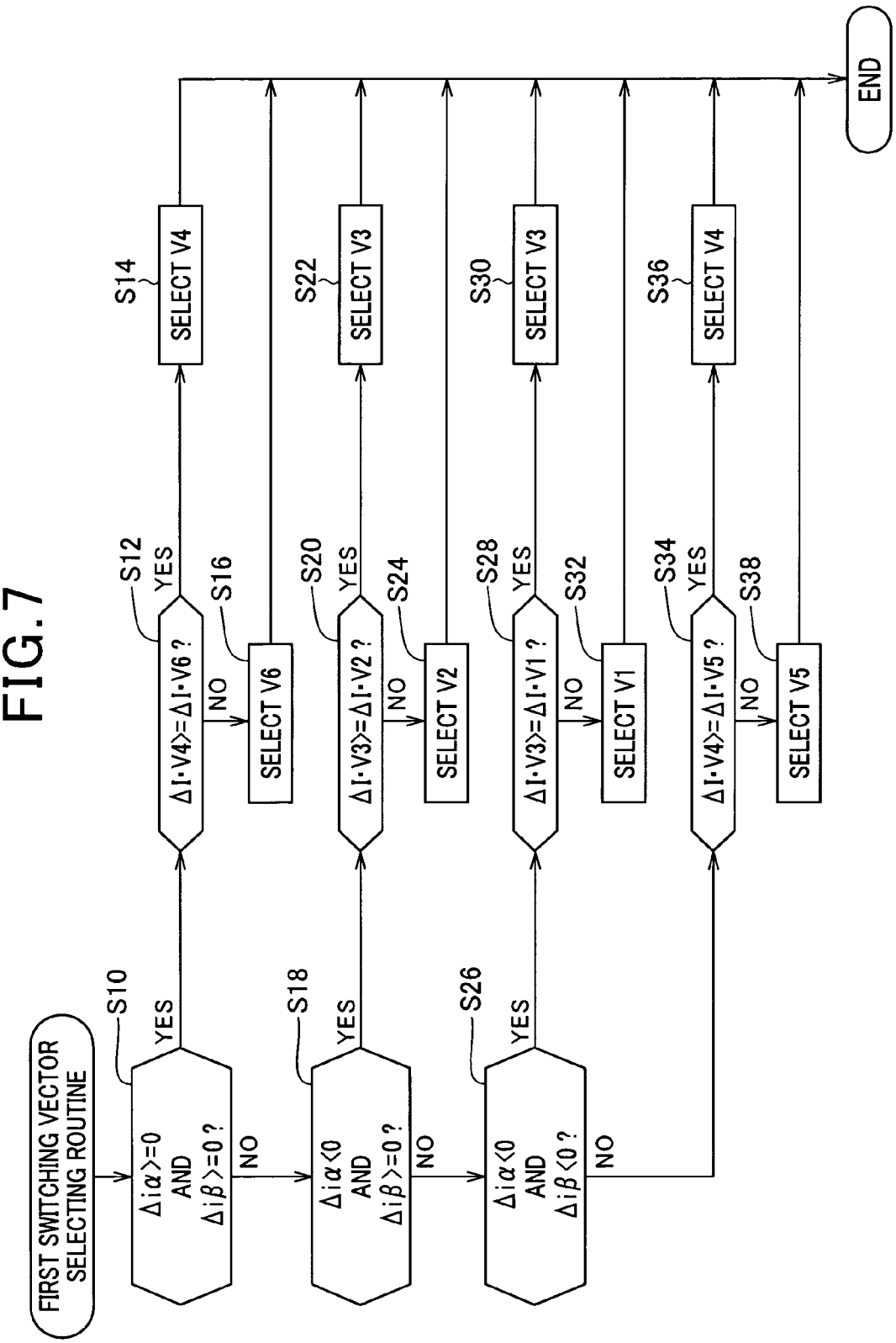
FIG. 7 is a flowchart schematically illustrating a first switching-vector selecting routine to be executed by the controller illustrated in FIG. 1 according to the first embodiment.

FIG. 7 schematically illustrates a routine to be executed by the first switching vector selector 80 for selecting the first switching vector Sv1. The first switching-vector selecting routine is programmed to be repeatedly executed by the first switching vector selector 80 (controller 50) every preset cycle.

Specifically, in step S10, the first switching vector selector 80 determines whether the different current vector ΔI is located in the upper right quadrant (first quadrant) of the α and β coordinate space. In other words, in step S10, the first switching vector selector 80 determines whether the α-axis component and the β-axis component are equal to or greater than zero.

Upon determining that the different current vector ΔI is located in the upper right quadrant of the α and β coordinate space (YES in step S10), the first switching vector selector 80 determines that non-zero vectors V4 and V6 may be the closest to the different current vector ΔI, going to step S12.

In step S12, the first switching vector selector 80 computes the inner product of the different current vector ΔI and the non-zero vector V4, referred to as "ΔI·V4", and computes the inner product of the different current vector ΔI and the non-zero vector V6, referred to as "ΔI·V6". Then, in step S12, the first switching vector selector 80 compares the inner product ΔI·V4 with the inner product ΔI·V6 to thereby determine whether the inner product ΔI·V4 is equal to or greater than the inner product ΔI·V6 based on the result of the comparison.

Upon determining that the inner product ΔI·V4 is equal to or greater than the inner product ΔI·V6 (YES in step S12), the first switching vector selector 80 selects the non-zero vector V4 as the first switching vector Sv1 in step S14, and otherwise (NO in step S12), the first switching vector selector 80 selects the non-zero vector V6 as the first switching vector Sv1 in step S16.

Otherwise, upon determining that the different current vector ΔI is not located in the upper right quadrant of the α and β coordinate space (NO in step S10), the first switching vector selector 80 proceeds to step S18.

In step S18, the first switching vector selector 80 determines whether the different current vector ΔI is located in the upper left quadrant (second quadrant) of the α and β coordinate space. In other words, in step S18, the first switching vector selector 80 determines whether the α-axis component of the different current vector ΔI is negative and the β-axis component thereof is equal to or greater than zero.

Upon determining that the different current vector ΔI is located in the upper left quadrant of the α and β coordinate space (YES in step S18), the first switching vector selector 80 determines that non-zero vectors V2 and V3 may be the closest to the different current vector ΔI, going to step S20.

In step S20, the first switching vector selector 80 computes the inner product of the different current vector ΔI and the non-zero vector V2, referred to as "ΔI·V2", and computes the inner product of the different current vector ΔI and the non-zero vector V3, referred to as "ΔI·V3". Then, in step S20, the first switching vector selector 80 compares the inner product ΔI·V3 with the inner product ΔI·V2 to thereby determine whether the inner product ΔI·V3 is equal to or greater than the inner product ΔI·V2 based on the result of the comparison.

Upon determining that the inner product ΔI·V3 is equal to or greater than the inner product ΔI·V2 (YES in step S20), the first switching vector selector 80 selects the non-zero vector V3 as the first switching vector Sv1 in step S22, and otherwise (NO in step S20), the first switching vector selector 80 selects the non-zero vector V2 as the first switching vector Sv1 in step S24.

Otherwise, upon determining that the different current vector ΔI is not located in the upper left quadrant of the α and β coordinate space (NO in step S18), the first switching vector selector 80 proceeds to step S26.

In step S26, the first switching vector selector 80 determines whether the different current vector ΔI is located in the lower left quadrant (third quadrant) of the α and β coordinate space. In other words, in step S26, the first switching vector selector 80 determines whether the α-axis component and the β-axis component of the different current vector ΔI are negative.

Upon determining that the different current vector ΔI is located in the lower left quadrant of the α and β coordinate space (YES in step S26), the first switching vector selector 80 determines that non-zero vectors V3 and V1 may be the closest to the different current vector ΔI, going to step S28.

In step S28, the first switching vector selector 80 computes the inner product of the different current vector ΔI and the non-zero vector V3, referred to as "ΔI·V3", and computes the inner product of the different current vector ΔI and the non-zero vector V1, referred to as "ΔI·V1". Then, in step S28, the first switching vector selector 80 compares the inner product ΔI·V3 with the inner product ΔI·V1 to thereby determine whether the inner product ΔI·V3 is equal to or greater than the inner product ΔI·V1 based on the result of the comparison.

Upon determining that the inner product ΔI·V3 is equal to or greater than the inner product ΔI·V1 (YES in step S28), the first switching vector selector 80 selects the non-zero vector V3 as the first switching vector Sv1 in step S30, and otherwise (NO in step S28), the first switching vector selector 80 selects the non-zero vector V1 as the first switching vector Sv1 in step S32.

Otherwise, upon determining that the different current vector ΔI is not located in the lower left quadrant of the α and β coordinate space (NO in step S26), the first switching vector selector 80 determines that the different current vector ΔI is located in the lower right quadrant (fourth quadrant) of the α and β coordinate space, proceeding to step S34.

In step S34, the first switching vector selector 80 computes the inner product of the different current vector ΔI and the non-zero vector V4, referred to as "ΔI·V4", and computes the inner product of the different current vector ΔI and the non-zero vector V5, referred to as "ΔI·V5". Then, in step S34, the first switching vector selector 80 compares the inner product ΔI·V4 with the inner product ΔI·V5 to thereby determine whether the inner product ΔI·V4 is equal to or greater than the inner product ΔI·V5 based on the result of the comparison.

Upon determining that the inner product ΔI·V4 is equal to or greater than the inner product ΔI·V5 (YES in step S34), the first switching vector selector 80 selects the non-zero vector V4 as the first switching vector Sv1 in step S36, and otherwise (NO in step S34), the first switching vector selector 80 selects the non-zero vector V5 as the first switching vector Sv1 in step S38.

Next, operations of the first switching vector selector 80 for identifying a region in which the different current vector ΔI is located will be described hereinafter.

When the different current vector ΔI is given (see FIG. 6), the first switching vector selector 80 identifies which of regions the different current vector ΔI is located in among the regions R1 to R6 defined by the non-zero vectors V1 to V6. Specifically, the first switching vector selector 80 narrows a search to two regions that may contain the different current vector ΔI based on the sings of the respective components of the different current vector ΔI. Thereafter, the first switching vector selector 80 computes the inner product of the different current vector ΔI and each of two non-zero vectors selected from all of the non-zero vectors; these two non-zero vectors define the identified two regions and are not shared with each other.

This identifies one of the two non-zero vectors that contains the different current vector ΔI based on a result of the inner product. For example, in FIG. 6, the region R1 is identified as the region in which the different current vector ΔI is located.

Figure 8:
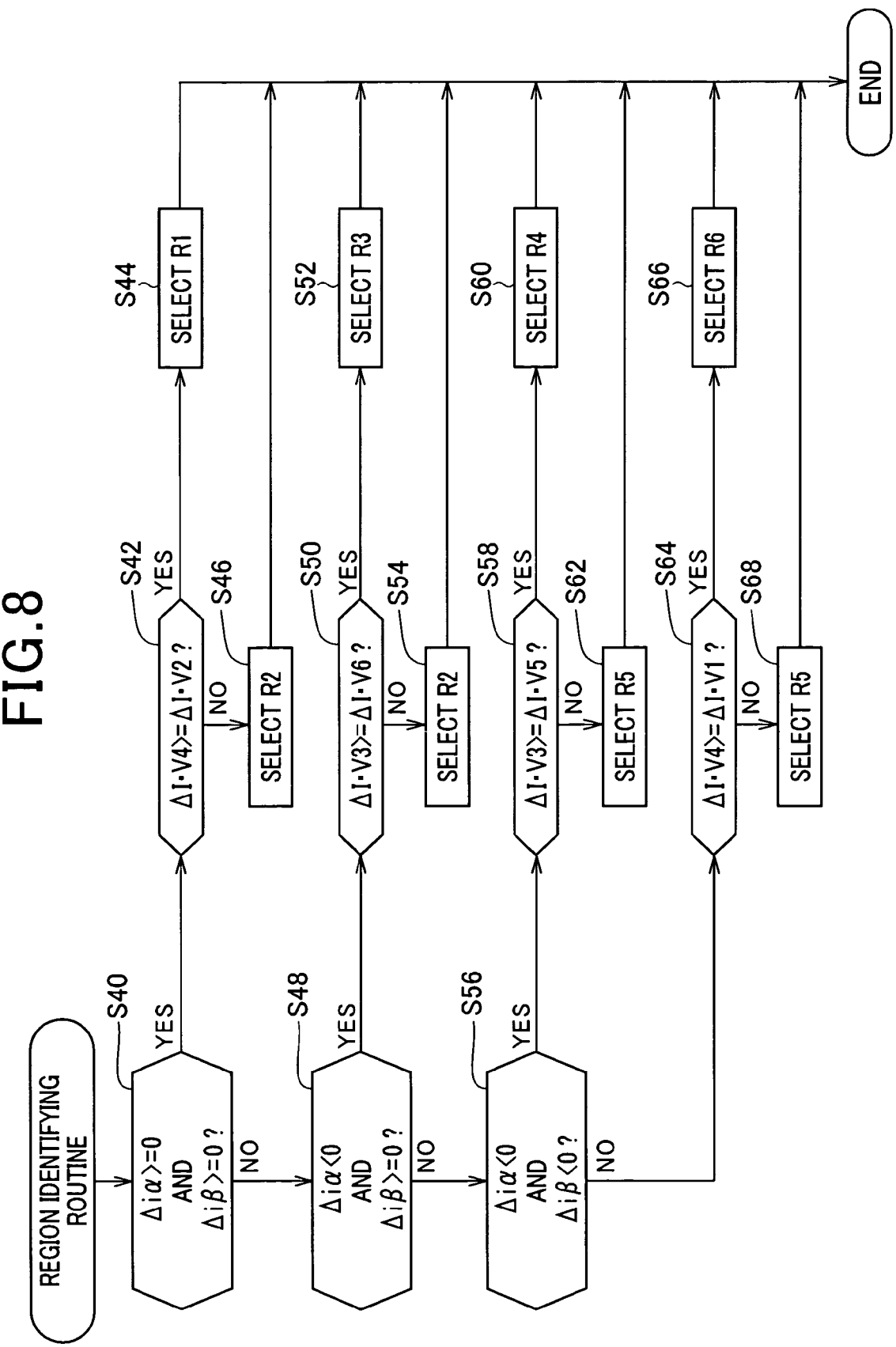
FIG. 8 is a flowchart schematically illustrating a region identifying routine to be executed by the controller illustrated in FIG. 1 according to the first embodiment.

FIG. 8 schematically illustrates a routine to be executed by the first switching vector selector 80 for identifying a region in which the different current vector ΔI lies. The region identifying routine is programmed to be repeatedly executed by the first switching vector selector 80 (controller 50) every preset cycle.

Specifically, in step S40, the first switching vector selector 80 determines whether the different current vector ΔI is located in the upper right quadrant of the α and β coordinate space. In other words, in step S40, the first switching vector selector 80 determines whether the α-axis component and the β-axis component are equal to or greater than zero.

Upon determining that the different current vector ΔI is located in the upper right quadrant of the α and β coordinate space (YES in step S40), the first switching vector selector 80 identifies that the different current vector ΔI may be located in the regions R1 and R2 contained in the upper right quadrant. Then, the first switching vector selector 80 carries out identification of which of the regions R1 and R2 contained in the upper right quadrant the different current vector ΔI is located in.

Specifically, in step S42, the first switching vector selector 80 selects the non-zero vectors V4 and V2 from all of the non-zero vectors V1 to V6; these selected non-zero vectors V4 and V2 define the identified regions R1 and R2 and are not shared with each other.

In step S42, the first switching vector selector 80 computes the inner product of the different current vector ΔI and the non-zero vector V4, referred to as "ΔI·V4", and computes the inner product of the different current vector ΔI and the non-zero vector V2, referred to as "ΔI·V7". Then, in step S42, the first switching vector selector 80 compares the inner product ΔI·V4 with the inner product ΔI·V2 to thereby determine whether the inner product ΔI·V4 is equal to or greater than the inner product ΔI·V2 based on the result of the comparison.

Upon determining that the inner product ΔI·V4 is equal to or greater than the inner product ΔI·V2 (YES in step S42), the first switching vector selector 80 selects the region R1 in which the different current vector ΔI is located in step S44, and otherwise (NO in step S42), the first switching vector selector 80 selects the region R2 in which the different current vector ΔI is located in step S46.

Otherwise, upon determining that the different current vector ΔI is not located in the upper right quadrant of the α and β coordinate space (NO in step S40), the first switching vector selector 80 proceeds to step S48.

In step S48, the first switching vector selector 80 determines whether the different current vector ΔI is located in the upper left quadrant of the α and β coordinate space. In other words, in step S48, the first switching vector selector 80 determines whether the α-axis component of the different current vector ΔI is negative and the β-axis component thereof is equal to or greater than zero.

Upon determining that the different current vector ΔI is located in the upper left quadrant of the α and β coordinate space (YES in step S48), the first switching vector selector 80 identifies that the different current vector ΔI may be located in the regions R2 and R3 contained in the upper left quadrant. Then, the first switching vector selector 80 carries out identification of which of the regions R2 and R3 contained in the upper left quadrant the different current vector ΔI is located in.

Specifically, in step S50, the first switching vector selector 80 selects the non-zero vectors V3 and V6 from all of the non-zero vectors V1 to V6; these selected non-zero vectors V3 and V6 define the identified regions R2 and R3 and are not shared with each other.

In step S50, the first switching vector selector 80 computes the inner product of the different current vector ΔI and the non-zero vector V3, referred to as "ΔI·V3", and computes the inner product of the different current vector ΔI and the non-zero vector V6, referred to as "ΔI·V6".

Then, in step S50, the first switching vector selector 80 compares the inner product ΔI·V3 with the inner product ΔI·V6 to thereby determine whether the inner product ΔI·V3 is equal to or greater than the inner product ΔI·V6 based on the result of the comparison.

Upon determining that the inner product ΔI·V3 is equal to or greater than the inner product ΔI·V6 (YES in step S50), the first switching vector selector 80 selects the region R3 in which the different current vector ΔI is located in step S52, and otherwise (NO in step S50), the first switching vector selector 80 selects the region R2 in which the different current vector ΔI is located in step S54.

Otherwise, upon determining that the different current vector ΔI is not located in the upper left quadrant of the α and β coordinate space (NO in step S48), the first switching vector selector 80 proceeds to step S56.

In step S56, the first switching vector selector 80 determines whether the different current vector ΔI is located in the lower left quadrant of the α and β coordinate space. In other words, in step S56, the first switching vector selector 80 determines whether the α-axis component and the β-axis component of the different current vector ΔI are negative.

Upon determining that the different current vector ΔI is located in the lower left quadrant of the α and β coordinate space (YES in step S56), the first switching vector selector 80 identifies that the different current vector ΔI may be located in the regions R4 and R5 contained in the lower left quadrant. Then, the first switching vector selector 80 carries out identification of which of the regions R4 and R5 contained in the lower left quadrant the different current vector ΔI is located in.

Specifically, in step S58, the first switching vector selector 80 selects the non-zero vectors V3 and V5 from all of the non-zero vectors V1 to V6; these selected non-zero vectors V3 and V5 define the identified regions R4 and R5 and are not shared with each other.

In step S58, the first switching vector selector 80 computes the inner product of the different current vector ΔI and the non-zero vector V3, referred to as "ΔI·V3", and computes the inner product of the different current vector ΔI and the non-zero vector V5, referred to as "ΔI·V5". Then, in step S58, the first switching vector selector 80 compares the inner product ΔI·V3 with the inner product ΔI·V5 to thereby determine whether the inner product ΔI·V3 is equal to or greater than the inner product ΔI·V5 based on the result of the comparison.

Upon determining that the inner product ΔI·V3 is equal to or greater than the inner product ΔI·V5 (YES in step S58), the first switching vector selector 80 selects the region R4 in which the different current vector ΔI is located in step S60, and otherwise (NO in step S58), the first switching vector selector 80 selects the region R5 in which the different current vector ΔI is located in step S62.

Otherwise, upon determining that the different current vector ΔI is not located in the lower left quadrant of the α and β coordinate space (NO in step S56), the first switching vector selector 80 determines that the different current vector ΔI is located in the lower right quadrant of the α and β coordinate space, proceeding to step S64.

Then, the first switching vector selector 80 carries out identification of which of the regions R5 and R6 contained in the lower right quadrant the different current vector ΔI is located in.

Specifically, in step S64, the first switching vector selector 80 selects the non-zero vectors V4 and V1 from all of the non-zero vectors V1 to V6; these selected non-zero vectors V4 and V1 define the identified regions R5 and R6 and are not shared with each other.

In step S64, the first switching vector selector 80 computes the inner product of the different current vector ΔI and the non-zero vector V4, referred to as "ΔI·V4", and computes the inner product of the different current vector ΔI and the non-zero vector V1, referred to as "ΔI·V1". Then, in step S64, the first switching vector selector 80 compares the inner product ΔI·V4 with the inner product ΔI·V1 to thereby determine whether the inner product ΔI·V4 is equal to or greater than the inner product ΔI·V1 based on the result of the comparison.

Upon determining that the inner product ΔI·V4 is equal to or greater than the inner product ΔI·V1 (YES in step S64), the first switching vector selector 80 selects the region R6 in which the different current vector ΔI is located in step S60, and otherwise (NO in step S64), the first switching vector selector 80 selects the region R5 in which the different current vector ΔI is located in step S68.

Figure 9:
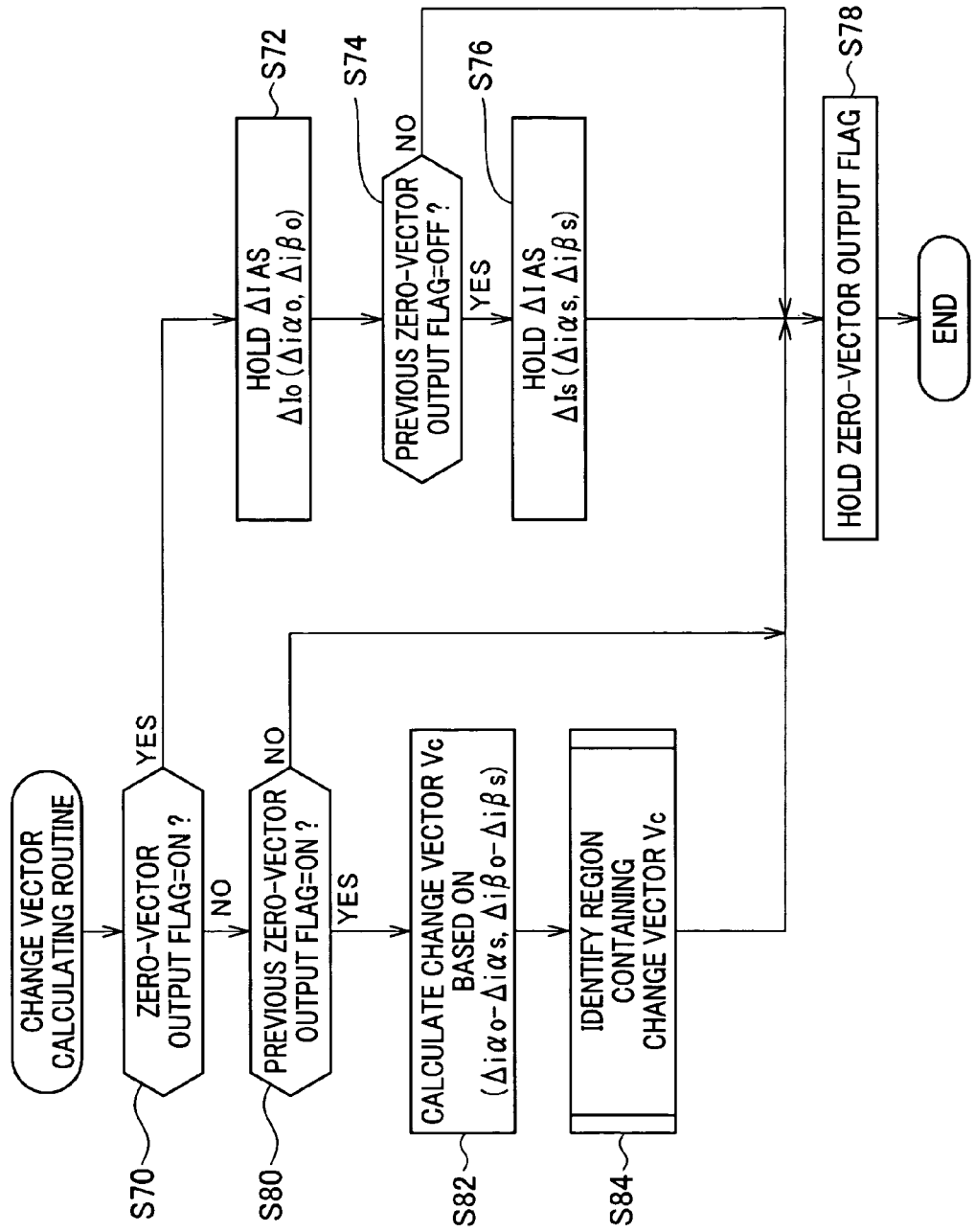
FIG. 9 is a flowchart schematically illustrating a change vector calculating routine to be executed by the controller illustrated in FIG. 1 according to the first embodiment.

FIG. 9 schematically illustrates a routine to be executed by the change vector calculator 82 for calculating the change vector Vc. The change vector calculating routine is programmed to be repeatedly executed by the change vector calculator 82 (controller 50) every preset cycle.

Specifically, in step S70, the change vector calculator 82 determines whether a zero-vector output flag indicative of whether the switching vector selector 88 illustrated in FIG. 4 outputs a zero vector. The zero-vector output flag, such as a binary bit, is configured to be set to ON (1) when it is determined that the switching vector selector 88 illustrated in FIG.

4 outputs a zero vector. The zero-vector output flag is configured to be set to OFF (0) when it is determined that the switching vector selector 88 illustrated in FIG. 4 outputs no zero vectors. The zero-vector output flag is for example set by software in the controller 50. An initial value of the zero-vector output flag is set to OFF (0).

Upon determining that the zero-vector output flag is set to ON (YES in step S70), the change vector calculator 82 holds therein actual α-axis and β-axis components of the different current vector ΔI as α-axis and β-axis components (Δiαo, Δiβo) of a different current vector ΔIo in step S72.

Repeated executions of the change vector calculating routines update the different current vector ΔIo until the zero-vector output flag is set to OFF.

Next, the change vector calculator 82 determines whether the previous zero-vector output flag is set to OFF during the pervious routine in step S74. The operation in step S74 is to determine whether the present routine represents a nonzero-to-zero switching timing at which the switching mode for the inverter IV is switched from the non-zero vector mode to the zero vector mode.

During the zero-vector output flag being set to ON (NO in step S74), the actual α-axis and β-axis components of the different current vector ΔI is updated as the α-axis and β-axis components (Δiαo, Δiβo) of the different current vector ΔIo each time the change vector calculating routine is executed in step S72.

Upon determining that the zero-vector output flag is set to OFF during the pervious routine (YES in step S74), the change vector calculator 82 holds therein the actual α-axis and β-axis components of the different current vector ΔI as α-axis and β-axis components (Δiαs, Δiβs) of a different current vector ΔIs at the nonzero-to-zero switching timing in step S76.

Upon determining that the zero-vector output flag is set to OFF (NO in step S70), the change vector calculator 82 determines whether the previous zero-vector output flag is set to ON during the pervious routine in step S80. The operation in step S80 is to determine whether the present routine represents a zero-to-nonzero switching timing at which the switching mode for the inverter IV is switched from the zero vector mode to the non-zero vector mode.

Upon determining that the previous zero-vector output flag is set to ON during the pervious routine (YES in step S80), the change vector calculator 82 determines that the present routine represents the zero-to-nonzero switching timing at which the switching mode for the inverter IV is switched from the zero vector mode to the non-zero vector mode.

Then, in step S82, the change vector calculator 82 subtracts the different current vector ΔIs at the nonzero-to-zero switching timing from the different current vector ΔIo at the zero-to-nonzero switching timing to thereby calculate the change vector Vc. The change vector Vc is predicted after next time the switching mode is set to one of the zero vectors.

After calculation of the change vector Vc, the change vector calculator 82 carries out a region identifying subroutine to identify one region from all of the regions R1 to R6 to thereby identify the selected region in which the change vector Vc is located in step S84.

Otherwise, upon determining that the zero-vector output flag is set to ON during the pervious routine (NO in step S74) or the zero-vector output flag is set to OFF during the pervious routine (NO in step S80), the change vector calculator 82 proceeds to step S78. Similarly, when the operation in step S76 or step S84 is completed, the change vector calculator 82 proceeds to step S78.

In step S78, the change vector calculator 82 holds therein the zero-vector output flag, and exits the change vector calculating routine.

Figure 10:
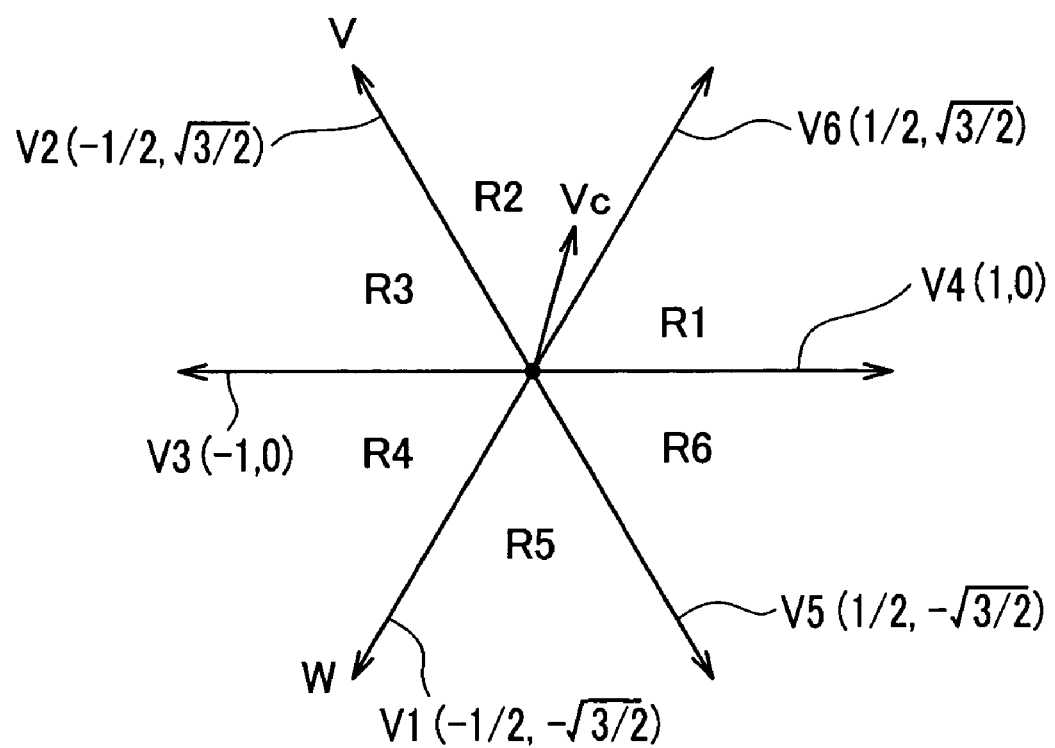
FIG. 10 is a vector diagram schematically illustrating a change vector in the α and β coordinate space according to the first embodiment.

FIG. 10 schematically illustrates an example of the change vector Vc calculated by the change vector calculating routine.

As well as the different current vector ΔI, the change vector calculator 82 carries out the region selecting subroutine to thereby identify which of regions the change vector Vc is located in among the regions R1 to R6 defined by the non-zero vectors V1 to V6. Specifically, the change vector calculator 82 carries out the region selecting subroutine to narrow a search to two regions that may contain the change vector Vc based on the sings of the respective components of the change vector Vc. Thereafter, the change vector calculator 82 computes the inner product of the different current vector ΔI and each of two non-zero vectors selected from all of the non-zero vectors; these two non-zero vectors define the identified two regions and are not shared with each other.

This identifies one of the two non-zero vectors that contains the change vector Vc based on a result of the inner product. For example, in FIG. 10, the region R2 is identified as the region in which the change vector Vc is located.

Figure 11:
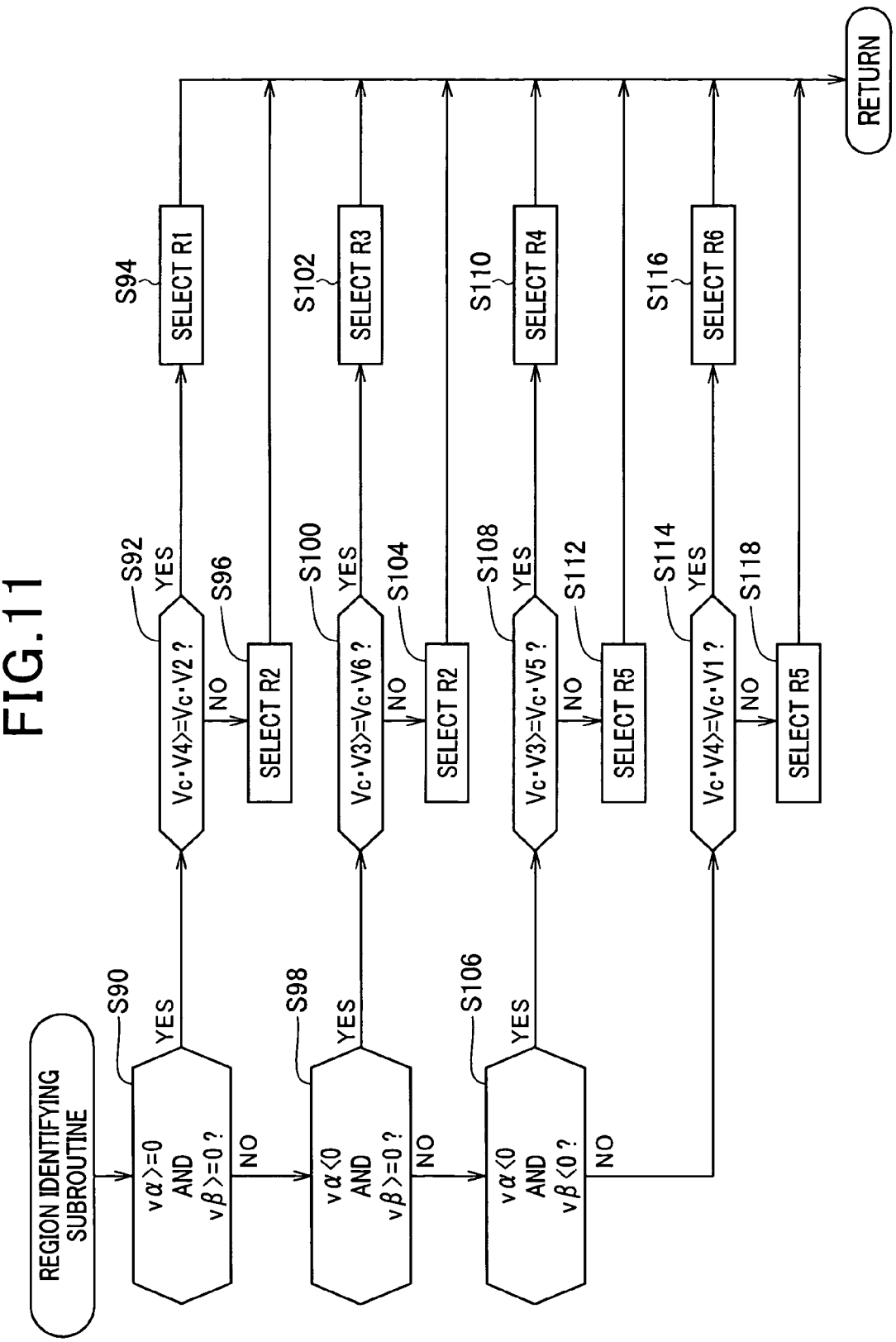
FIG. 11 is a flowchart schematically illustrating a region identifying subroutine in step S84 of FIG. 9 according to the first embodiment.

FIG. 11 schematically illustrates the region identifying subroutine in step S84 for identifying a region in which the change vector Vc lies; this subroutine is substantially identical to the region identifying routine illustrated in FIG. 8. That is, the operations of the region identifying routine illustrated in FIG. 8 correspond to the region identifying subroutine illustrated in FIG. 11. The region identifying subroutine is programmed to be repeatedly executed by the change vector calculator 82 (controller 50) every preset cycle.

Specifically, when the change vector Vc is located in the upper right quadrant (YES in step S90), and the inner product Vc·V4 is equal to or greater than the inner product Vc·V2 (YES in step S92), it is selected that the region R1 in which the change vector Vc is located in step S94. When the change vector Vc is located in the upper right quadrant (YES in step S90), and the inner product Vc·V4 is less than the inner product Vc·V2 (NO in step S92), it is selected that the region R2 in which the change vector Vc is located in step S96.

When the change vector Vc is located in the upper left quadrant (YES in step S98), and the inner product Vc·V3 is equal to or greater than the inner product Vc·V6 (YES in step S100), it is selected that the region R3 in which the change vector Vc is located in step S102. When the change vector Vc is located in the upper left quadrant (YES in step S98), and the inner product Vc·V3 is less than the inner product Vc·V6 (NO in step S100), it is selected that the region R2 in which the change vector Vc is located in step S104.

When the change vector Vc is located in the lower left quadrant (YES in step S106), and the inner product Vc. V3 is equal to or greater than the inner product Vc·V5 (YES in step S108), it is selected that the region R4 in which the change vector Vc is located in step S110. When the change vector Vc is located in the lower left quadrant (YES in step S106), and the inner product Vc·V3 is less than the inner product Vc·V5 (NO in step S108), it is selected that the region R5 in which the change vector Vc is located in step S112.

When the change vector Vc is located in the lower right quadrant (NO in step S106), and the inner product Vc·V4 is equal to or greater than the inner product Vc·V1 (YES in step S114), it is selected that the region R6 in which the change vector Vc is located in step S116. When the change vector Vc is located in the lower right quadrant (NO in step S106), and the inner product Vc·V4 is less than the inner product Vc·V1 (NO in step S114), it is selected that the region R5 in which the change vector Vc is located in step S118.

The second switching vector selector 84 is configured to calculate the second switching vector Sv2 based on a map M3 stored therein. The map M3 has stored therein data indicative of a relationship between a variable of the second switching vector Sv2, a variable of the selected first switching vector Sv1, and a variable of a region in which the change vector Vc is located. In the first embodiment, the map M3 is composed of, for example, a function formula, a data table, and/or a program.

Referring to FIG. 12, the map M3 is configured such that:

when the selected first switching vector Sv1 outputted from the first switching vector selector 80 defines one boundary of a region in which the change vector Vc is located, one of the non-zero vectors that defines the other boundary of the region in which the change vector Vc is located is selected as the second switching vector S2; and when the selected first switching vector Sv1 outputted from the first switching vector selector 80 does not define one boundary of the region in which the change vector Vc is located, one of the zero vectors, such as zero vector V0, is selected as the second switching vector Sv2.

For example, referring to FIG. 12, when the non-zero vector V2 is selected as the first switching vector Sv1, the non-zero vector V6 that defines the other boundary of the region R2 is selected as the second switching vector Sv2. This is because the first switching vector Sv1 defines one boundary of the region R2 in which the change vector Vc is located.

In addition, when the non-zero vector V5 is selected as the first switching vector Sv1, because the first switching vector Sv1 does not define one boundary of the region R2 in which the change vector Vc is located, the zero vector V0 is selected as the second switching vector Sv2.

Figure 13:
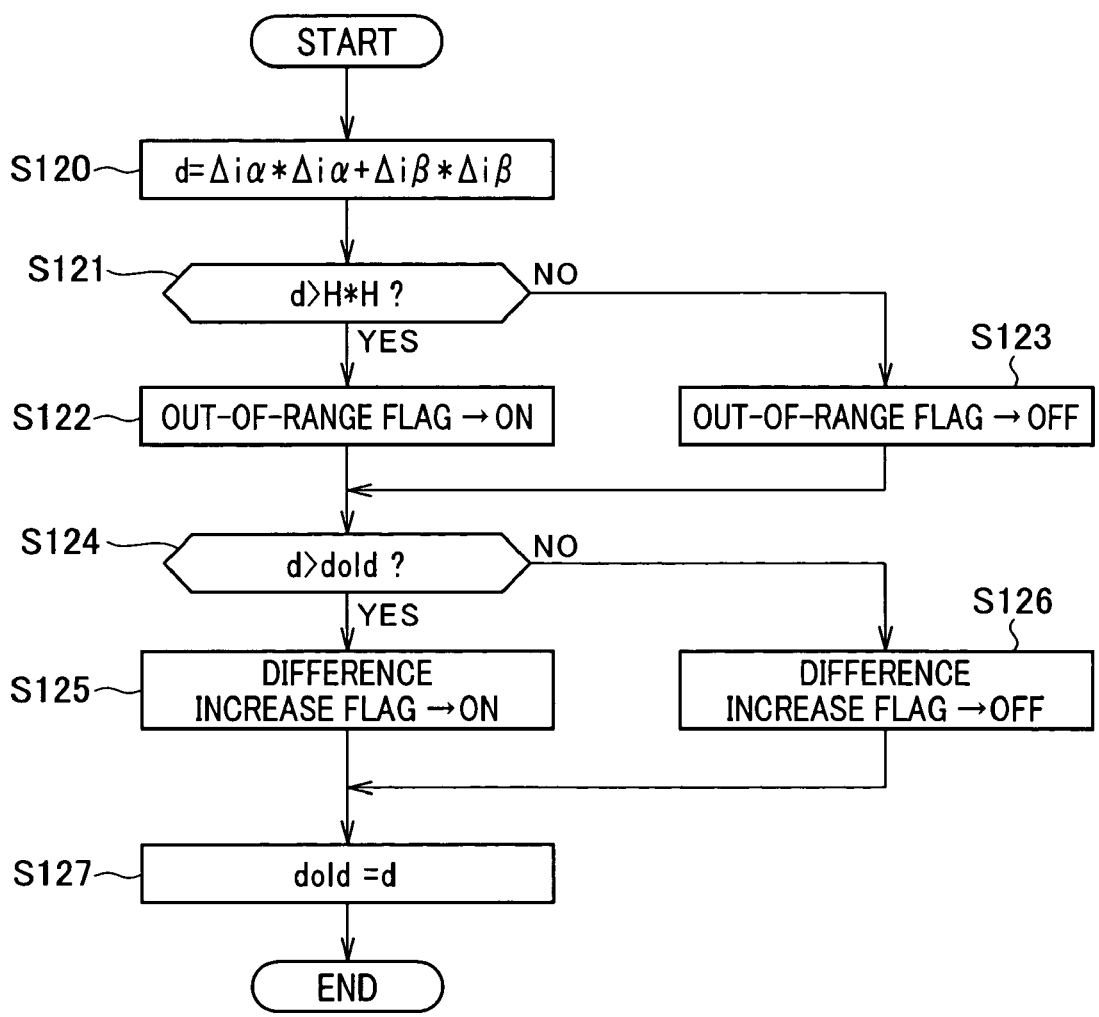
FIG. 13 is a flowchart schematically illustrating a routine to be executed by a difference monitor according to the first embodiment.

FIG. 13 schematically illustrates a routine to be executed by the difference monitor 86. The routine is programmed to be repeatedly executed by the difference monitor 86 (controller 50) every preset cycle.

Specifically, in step S120, the difference monitor 86 calculates the norm d of the different current vector ΔI in accordance with the following equation [c10]:

$$d = \Delta i\alpha \cdot \Delta i\alpha + \Delta i\beta \cdot \Delta i\beta \qquad [c10]$$

Next, in step S121, the difference monitor 86 calculates the product of the radius H of the allowable range and the radius H thereof as a threshold value. Then, in step S121, the difference monitor 86 determines whether the norm d is greater than the product of the radius H and the radius H. The operation in step S121 is to determine whether the different current vector ΔI is out of the circled allowable range with the radius H.

Upon determining that the norm d is greater than the product of the radius H and the radius H (YES in step S121), the difference monitor 86 proceeds to step S122. In step S122, the difference modulator 86 sets an out-of-range flag, such as a binary bit, to ON (1); this out-of-range flag represents that the different current vector ΔI is out of the circled allowable range. The zero-vector output flag is for example set by software in the controller 50.

Otherwise, upon determining that the norm d is equal to or less than the product of the radius H and the radius H (NO in step S121), the difference monitor 86 proceeds to step S123. In step S123, the difference modulator 86 sets the out-of-range flag to OFF (0).

After completion of step S122 or S123, the difference monitor 86 determines whether a present value of the norm d is greater than a previous value dold of the norm d in step S124. This operation in step S124 is to determine whether the difference of the actual current vector I from the command current vector Ic increases.

Upon determining that the present value of the norm d is greater than the previous value dold of the norm d (YES in step S124), the difference modulator 86 proceeds to step S125. In step S125, the difference modulator 86 sets a difference increase flag, such as a binary bit, to ON (1) in step S125; this difference increase flag represents that the difference of the actual current vector I from the command current vector Ic increases. The difference increase flag is for example set by software in the controller 50.

Otherwise, upon determining that the present value of the norm d is equal to or less than the previous value dold of the norm d (NO in step S124), the difference modulator 86 sets the difference increase flag to OFF (0) in step S126.

After completion of step S125 or S126, the difference monitor 86 sets the present value of the norm d to the previous value dold, exiting the routine.

Note that, during the routine illustrated in FIG. 13, in order to prevent improper determination due to noise and the like, the difference monitor 86 can be programmed to shift to step S122 only when the affirmative determination in step S121 is continuously repeated at preset times. Similarly, in order to prevent improper determination due to noise and the like, the difference monitor 86 can be programmed to shift to step S125 only when the affirmative determination in step S124 is continuously repeated at preset times.

In addition, in step S120, the difference monitor 86 can be programmed to calculate the norm d of the different current vector ΔI while reducing the change in the norm d. For example, the difference monitor 86 can be programmed to calculate, as the present value of the norm d, the average of the previous value dold of the norm d and the present calculated value of "$\Delta i\alpha \cdot \Delta i\alpha + \Delta i\beta \cdot \Delta i\beta$". The difference monitor 86 can also be programmed to calculate, as the present value of the norm d, a moving average of a preset number of calculated values of the norm d.

Figure 14:
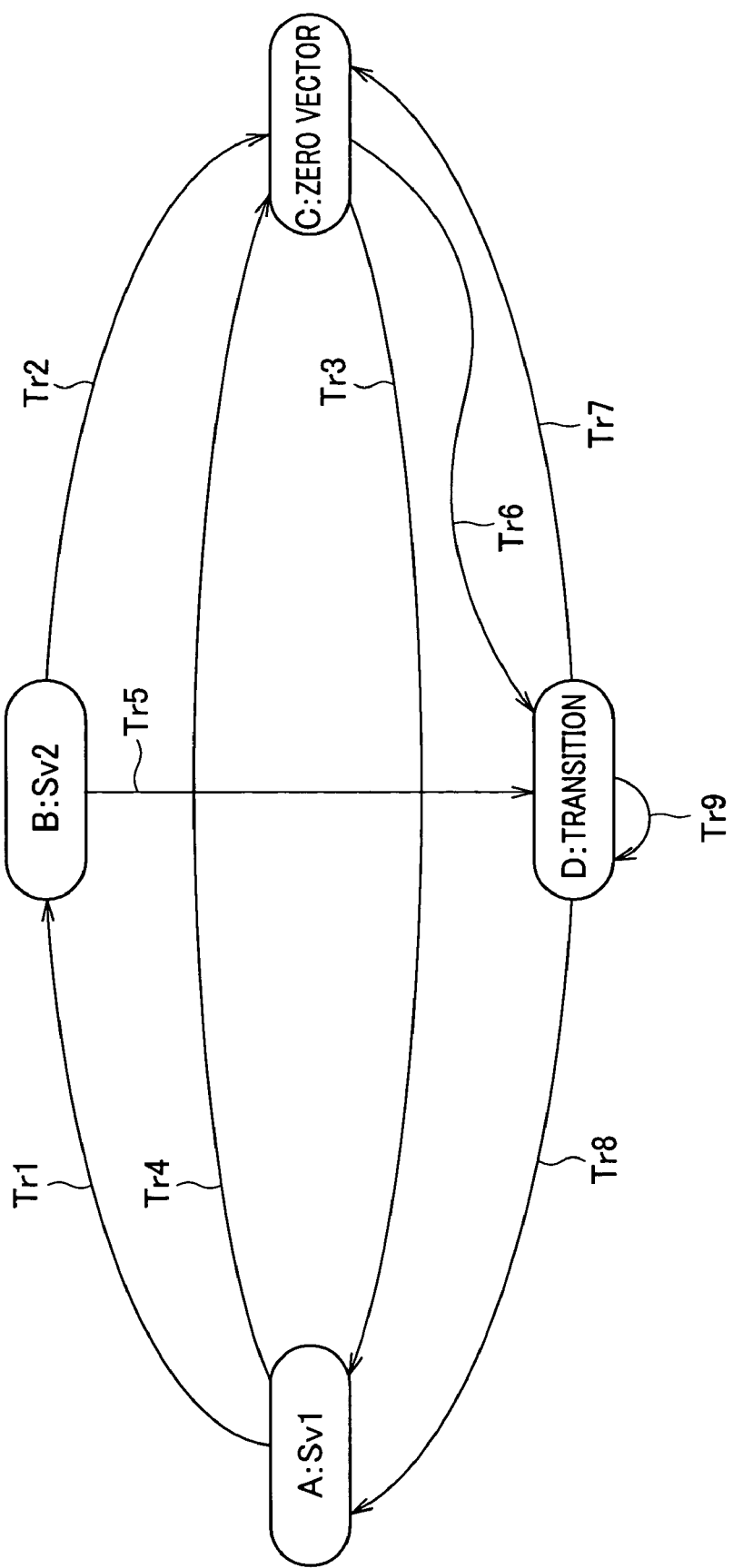
FIG. 14 is a drive-mode transition diagram schematically illustrating a drive method of an inverter illustrated in FIG. 1 according to the first embodiment.

FIG. 14 is a drive-mode transition diagram schematically illustrating a drive method of the inverter IV by the switching vector selector 88.

The switching vector selector 88 is configured to have the following four drive modes A, B, C, and D. The drive modes A, B, and C are used for the steady-state control method illustrated in FIG. 14.

The switching vector selector 88 in the drive mode A works to output the first switching vector Sv1 when the first switching vector Sv1 defines one boundary of a region in which the change vector Vc is located.

The switching vector selector 88 in the drive mode B works to output the second switching vector Sv2 as an alternative non-zero vector when the alternative non-zero vector defines the other boundary of the region in which the change vector Vc is located. Note that the second switching vector Sv2 to be outputted from the switching vector selector 88 in the drive mode B is normally different from that to be outputted from the second switching selector 84 immediately before the switching from the drive mode A to the drive mode B. Specifically, the switching vector selector 88 works to carry out output of the second switching vector Sv2 that has been stored therein during the drive mode A.

The switching vector selector 88 in the drive mode C works to output one of the zero vectors.

The switching vector selector 88 in the drive mode D works to drive the inverter IV under transient states in which an unexpected behavior of the different current vector ΔI appears for the steady-state control method illustrated in FIG. 3.

Operations of the switching vector selector 88 in each of the drive modes A, B, C, and D will be described hereinafter.

Figure 15:
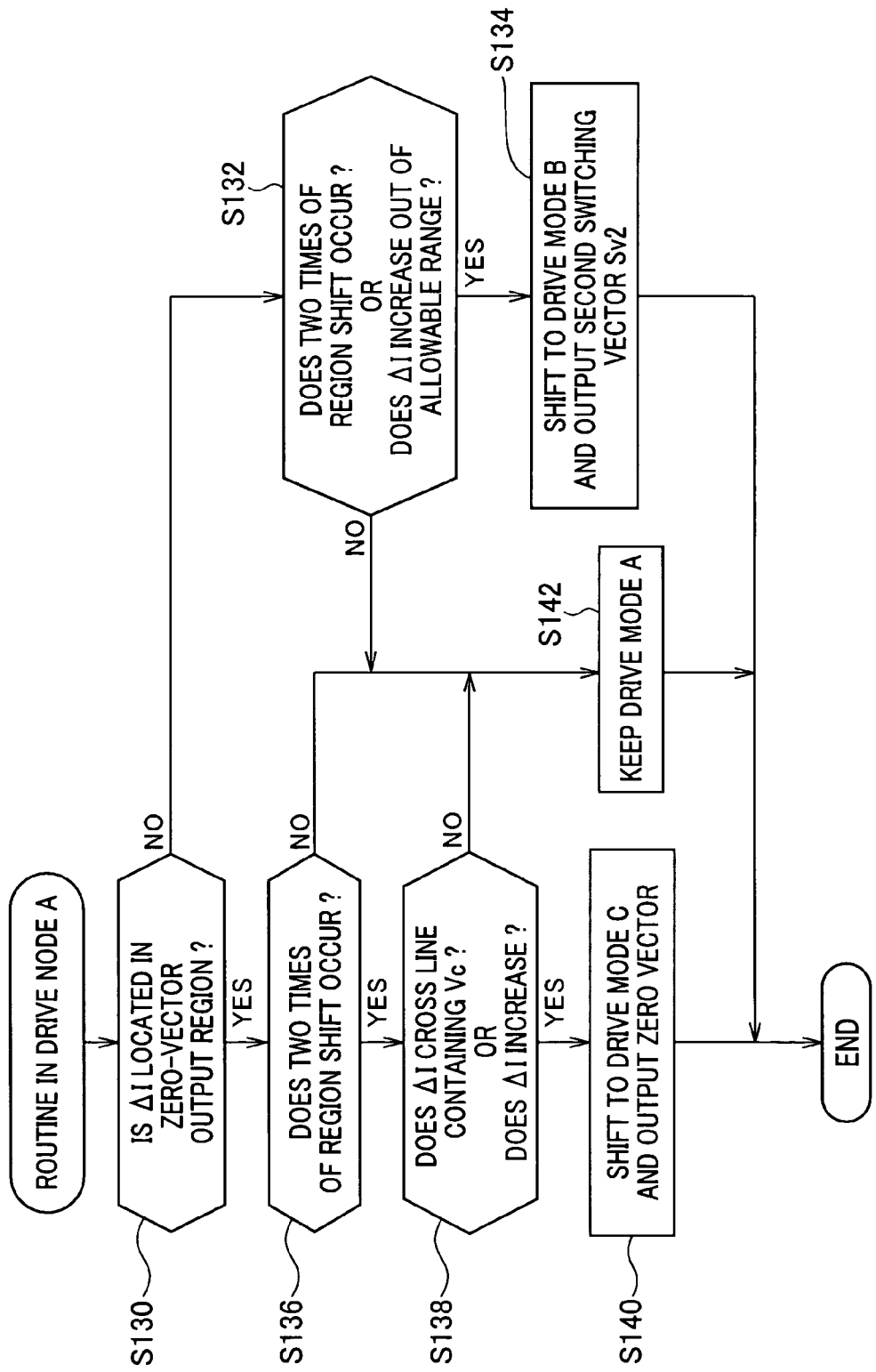
FIG. 15 is a flowchart schematically illustrating a routine in a drive mode A to be executed by a switching vector selector illustrated in FIG. 4 according to the first embodiment.

FIG. 15 schematically illustrates a routine in the drive mode A to be executed by the switching vector selector 88. The routine is programmed to be repeatedly executed by the switching vector selector 88 (controller 50) every preset cycle.

Launching the routine, in step S130, the switching vector selector 88 determines whether the different current vector ΔI is located in a zero-vector output region of the α and β coordinate space. Note that, in the first embodiment, the zero-vector output region is defined as a region through which the opposite direction of the change vector Vc passes, in other words, as a region symmetrical with a region in which the change vector Vc lies about the origin of the α and β coordinate space corresponding to the center point of the circled allowable range.

Specifically, in step S130, the switching vector selector 88 determines whether the different current vector ΔI is located in the zero-vector output region of the α and β coordinate space based on a map M4 stored therein. The map M4 has stored therein data indicative of a relationship between a variable of the zero-vector output region, a variable of a region in which the change vector Vc is located, and a variable of a region in which the difference current vector ΔI is located. In the first embodiment, the map M4 is composed of, for example, a function formula, a data table, and/or a program.

Referring to FIG. 16, the map M4 is configured to, when a region in which the present difference current vector ΔI is located and a region in which the present change vector Vc are inputted, determine whether the present difference current vector ΔI is located in the zero-vector output region based on the inputted regions.

For example, when the region R3 in which the present difference current vector ΔI is located and the region R5 in which the present change vector Vc are inputted, because information indicative of "0" is set in the map M4 corresponding to the inputted regions R3 and R5, the switching vector selector 88 determines that the present difference current vector ΔI is not located in the zero-vector output region.

In contrast, when the region R6 in which the present difference current vector ΔI is located and the region R3 in which the present change vector Vc are inputted, because information indicative of "1" is set in the map M4 corresponding to the inputted regions R6 and R3, the switching vector selector 88 determines that the present difference current vector ΔI is located in the zero-vector output region.

Upon determining that the present difference current vector ΔI is not located in the zero-vector output region (NO in step S130), the switching vector selector 88 shifts to step S132. In step S132, the switching vector selector 88 determines whether:

there are two times of region shift of the different current vector ΔI in the α and β coordinate space; or the difference current vector ΔI increases out of the allowable range.

The OR conditions in step S132 provide a transition condition Tr1 from the drive mode A to the drive mode B illustrated in FIG. 14.

The former condition represents an ideal condition for the inverter switching pattern illustrated in FIG. 3 as a switching condition from the first switching vector Sv1 to the second switching vector Sv2.

In contrast, the latter condition represents a switching timing from the first switching vector Sv1 to the second switching vector Sv2 when an unexpected behavior of the difference current vector ΔI appears for the inverter switching pattern illustrated in FIG. 3.

Specifically, when the difference current vector ΔI is located out of the allowable range while increasing, the switching vector selector 88 determines that the present switching may not be suitable for controlling the difference current vector ΔI within the allowable range, thus changing the first switching vector Sv1 to the second switching vector Sv2.

Otherwise, upon determining that there are two times of region shift of the different current vector ΔI in the α and β coordinate space or the difference current vector ΔI increases out of the allowable range (YES in step S132), the switching vector selector 88 determines that the transition condition Tr1 is met, shifting to step S134.

In step S134, the switching vector selector 88 shifts the drive mode for the inverter IV from the drive mode A to the drive mode B to thereby shift the inverter switching from the first switching vector Sv1 to the second switching vector Sv2.

Note that, as set forth above, the second switching vector Sv2 is a vector outputted from the second switching selector 84 during the drive mode A; this vector is normally different from the second switching vector Sv2 to be outputted from the second switching selector 84 immediately before the switching from the drive mode A to the drive mode B.

Otherwise, upon determining that the present difference current vector ΔI is located in the zero-vector output region (YES in step S130), the switching vector selector 88 shifts to step S136.

In step S136, the switching vector selector 88 determines whether two times of region shift of the different current vector ΔI occur in the α and β coordinate space as well as the former condition.

Upon determining that two times of region shift of the different current vector ΔI occur in the α and β coordinate space as well as the former condition (YES in step S136), the switching vector selector 88 determines, in step S138, whether:

the different current vector ΔI crosses a line, which is parallel to the change vector Vc and passes thorough the zero point; or the difference current vector ΔI increases out of the allowable range.

The affirmative condition in step S136 and the OR conditions in step S138 provide a transition condition Tr4 from the drive mode A to the drive mode C illustrated in FIG. 14.

Specifically, when the difference current vector ΔI increases out of the allowable range, changing the inverter switching from the first switching vector Sv1 to one of the zero vectors probably allows the difference current vector ΔI to enter into the allowable range and remain therewithin for a comparatively long period of time. For this reason, it is suitable to set the drive mode for the inverter IV to the zero vector mode when the latter condition is met.

In addition, when the different current vector ΔI crosses the line parallel to the change vector Vc and passing thorough the zero point, changing the inverter switching from the first switching vector Sv1 to one of the zero vectors probably allows the difference current vector ΔI to remain therewithin for a comparatively long period of time. This is because the different current vector ΔI changes along the line. Additionally, when the different current vector ΔI goes out of the allowable range, a transition condition Tr3 illustrated in FIG.

14 is probably met. For this reason, it is also suitable to set the drive mode for the inverter IV to the zero vector mode when the former condition is met.

Thus, upon determining that the different current vector ΔI crosses the line parallel to the change vector Vc and passing the zero point or the difference current vector ΔI increases out of the allowable range (YES in step S138), the switching vector selector 88 shifts to step S140.

In step S140, the switching vector selector 88 shifts the drive mode for the inverter IV from the drive mode A to the drive mode C to thereby shift the inverter switching from the first switching vector Sv1 to one of the zero vectors.

Otherwise, when a negative determination occurs in at least one of steps S132, 3136, and S138, the switching vector selector 88 maintains the drive mode A for the inverter IV. When the operation in step S134, S140, or S142 is completed, the switching vector selector 88 terminates the routine in the drive mode A.

Figure 17:
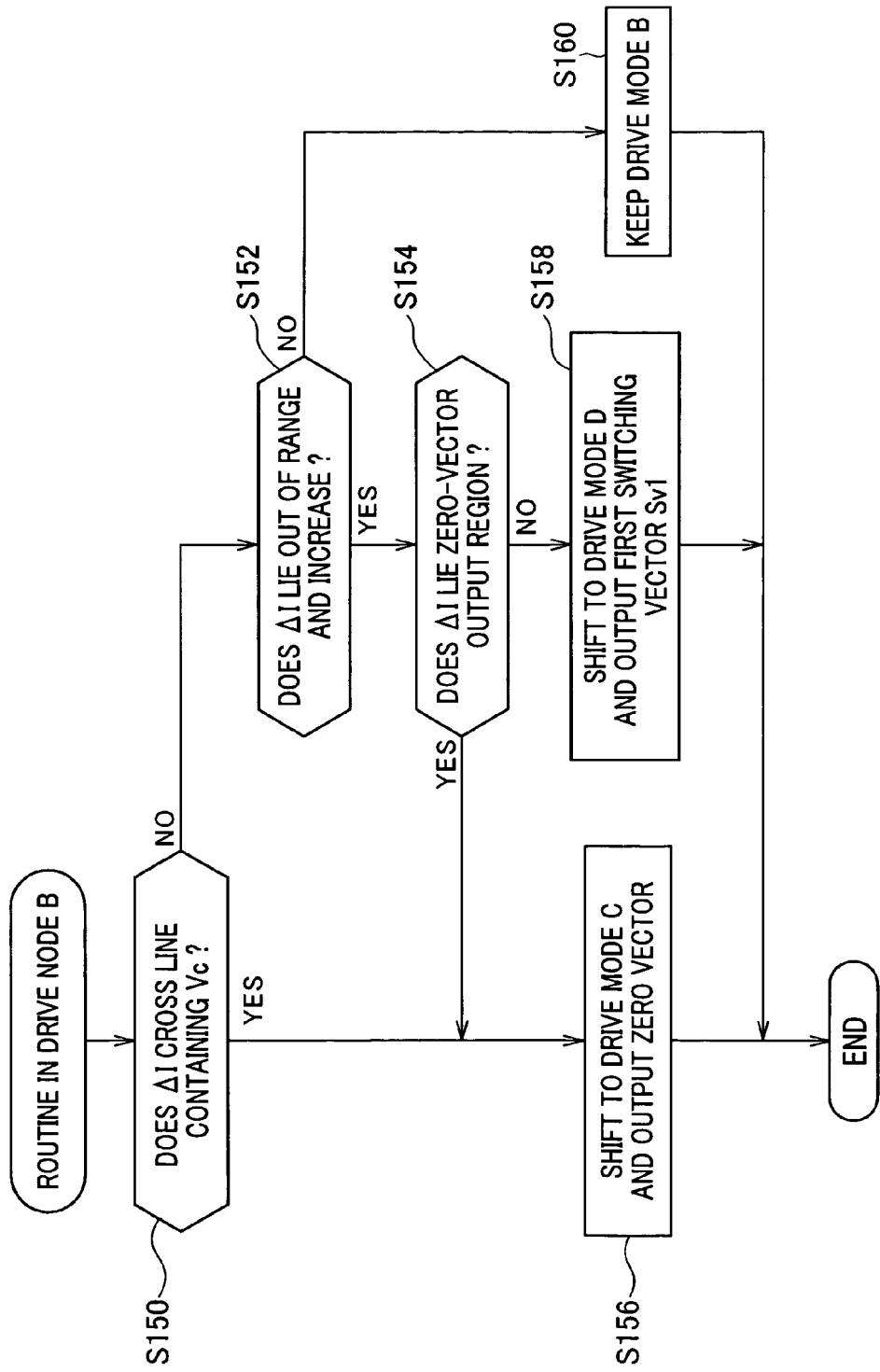
FIG. 17 is a flowchart schematically illustrating a routine in a drive mode B to be executed by the switching vector selector according to the first embodiment.

FIG. 17 schematically illustrates a routine in the drive mode B to be executed by the switching vector selector 88. The routine is programmed to be repeatedly executed by the switching vector selector 88 (controller 50) every preset cycle.

Launching the routine, in step S150, the switching vector selector 88 determines whether the different current vector ΔI crosses a line parallel to the change vector Vc and passing thorough the zero point.

Upon determining that the different current vector ΔI does not pass through the line, the switching vector selector 88 shifts to step S152. In step S152, the switching vector selector 88 determines whether the difference current vector ΔI increases out of the allowable range.

Upon determining that the difference current vector ΔI increases out of the allowable range (YES in step S152), the switching vector selector 88 determines whether the different current vector ΔI is located in the zero-vector output region of the α and β coordinate space in step S154 in the same manner as the step S130 of FIG. 15.

The condition of the affirmative determination in step S150 and that of the affirmative determination in step S154 provide a transition condition Tr2 from the drive mode B to the drive mode C illustrated in FIG. 14. The reason why it is suitable to shift the drive mode for the inverter IV from the drive mode B to the drive mode (zero vector mode) C is substantially identical to the reason shown in the descriptions of the operation in step S138.

Upon determining that the different current vector ΔI crosses the line (YES in step S150) or the different current vector ΔI is located in the zero-vector output region of the α and β coordinate space (YES in step S154), the switching vector selector 88 shifts to step S156.

In step S156, the switching vector selector 88 shifts the drive mode for the inverter IV from the drive mode B to the drive mode C to thereby shift the inverter switching from the second switching vector Sv2 to one of the zero vectors.

Otherwise, upon determining that the different current vector ΔI is not located in the zero-vector output region of the α and β coordinate space (NO in step S154), the switching vector selector 88 shifts to step S158.

In step S158, the switching vector selector 88 shifts the drive mode for the inverter IV from the drive mode B to the drive mode D to thereby shift the inverter switching from the second switching vector Sv2 to the latest first switching vector Sv1 outputted from the first switching vector selector 80.

The condition of the negative determination in step S154 provides a transition condition Tr5 from the drive mode B to the drive mode D illustrated in FIG. 14. The condition represents a condition of whether an unexpected behavior of the difference current vector ΔI appears under the steady-state control illustrated in FIG. 3. When the difference current vector ΔI unexpectedly behaves, the inverter switching is controlled to the first switching vector Sv1 that is the closest to the difference current vector ΔI so that the difference current vector ΔI is controlled within the allowable range. The drive mode for the inverter IV using the first switching vector Sv1 is substantially equivalent to a drive mode for the inverter IV under well-known instantaneous current-value control using hysteresis comparators.

Otherwise, when a negative determination occurs in step S152, the switching vector selector 88 maintains the drive mode B for the inverter IV. When the operation in step S156, S158, or S160 is completed, the switching vector selector 88 terminates the routine in the drive mode B.

Figure 18:
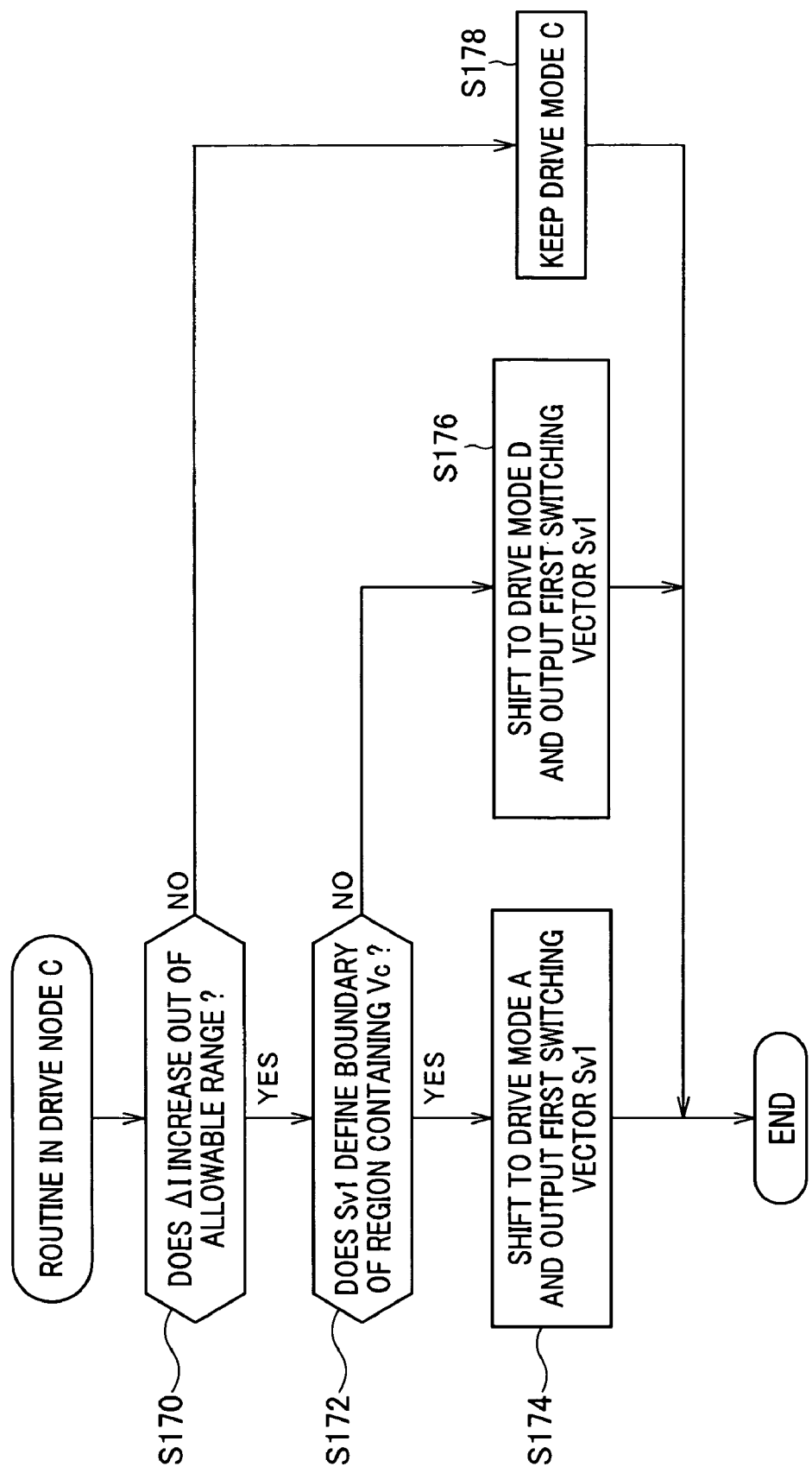
FIG. 18 is a flowchart schematically illustrating a routine in a drive mode C to be executed by the switching vector selector according to the first embodiment.

FIG. 18 schematically illustrates a routine in the drive mode C to be executed by the switching vector selector 88. The routine is programmed to be repeatedly executed by the switching vector selector 88 (controller 50) every preset cycle.

Launching the routine, in step S170, the switching vector selector 88 determines whether the different current vector ΔI increases out of the allowable range.

Upon determining that the difference current vector ΔZ increases out of the allowable range (YES in step S170), the switching vector selector 88 determines whether the first switching vector Sv1 defines one boundary of a region containing the change vector Vc in step S172.

Specifically, in step S172, the switching vector selector 88 determines whether the output of the second switching vector selector 84 is zero.

The condition of the affirmative determination in step S172 provides a transition condition Tr3 from the drive mode C to the drive mode A illustrated in FIG. 14.

When the condition of the affirmative determination in step S172 is met, the switching vector selector 88 shifts the drive mode for the inverter IV from the drive mode C to the drive mode A to thereby output the first switching vector Sv1 in step S174

Otherwise, upon determining that the first switching vector Sv1 does not define one boundary of the region containing the change vector Vc (NO in step S172), the switching vector selector 88 goes to step S176. In step S176, the switching vector selector 88 shifts the drive mode for the inverter IV to the drive mode D to thereby shift the inverter switching to the latest first switching vector Sv1 outputted from the first switching vector selector 80.

The condition of the negative determination in step S172 provides a transition condition Tr6 from the drive mode C to the drive mode D illustrated in FIG. 14. The descriptions of the transition condition Tr6 and the drive mode D are substantially the same as those of the transition condition Tr5 and the drive mode D in the case of the negative determination in step S154.

Otherwise, when a negative determination occurs in step S170, the switching vector selector 88 maintains the drive mode C for the inverter IV in step S178. When the operation in step S174, S176, or S178 is completed, the switching vector selector 88 terminates the routine in the drive mode C.

Figure 19:
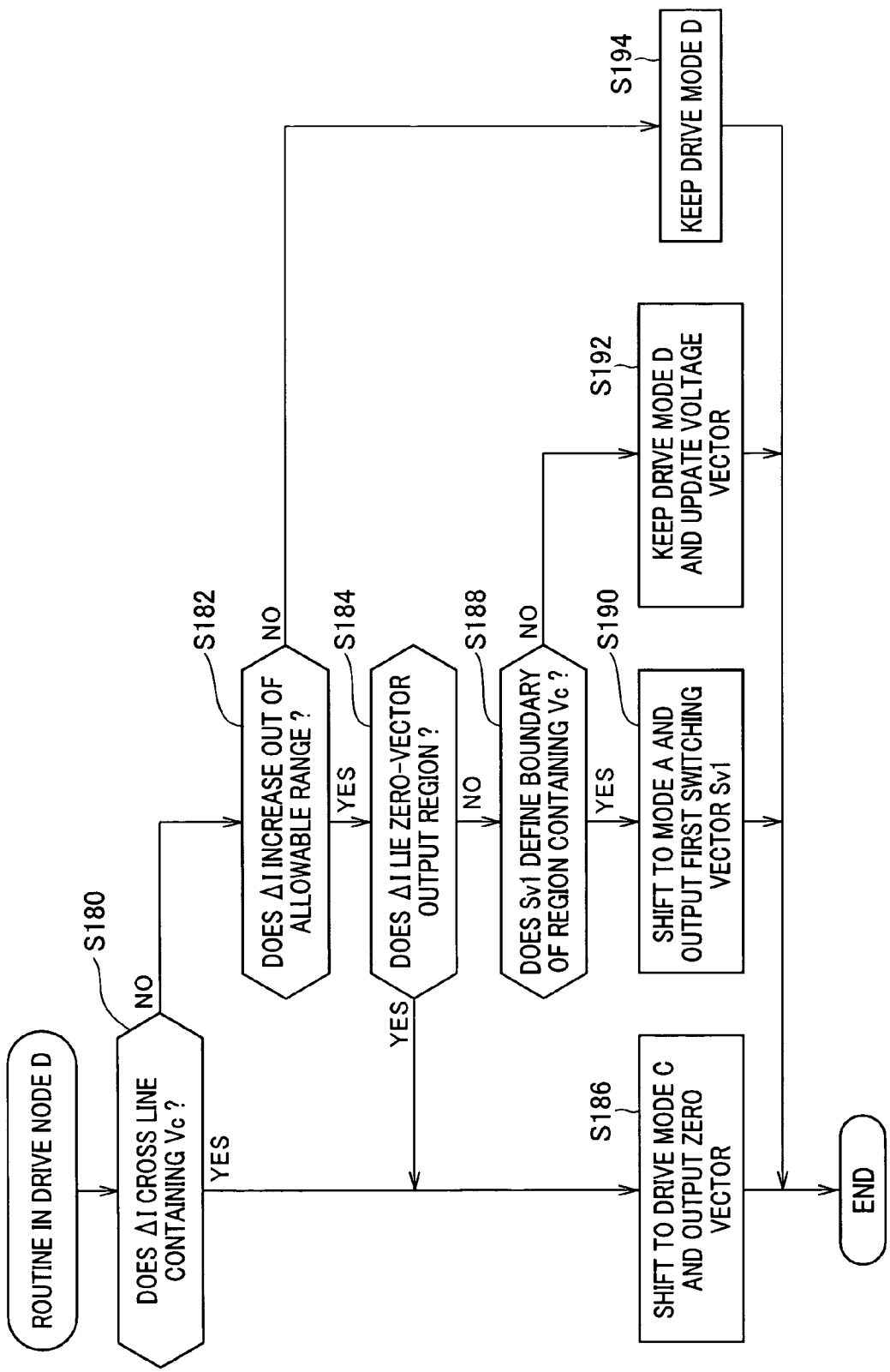
FIG. 19 is a flowchart schematically illustrating a routine in a drive mode D to be executed by the switching vector selector according to the first embodiment.

FIG. 19 schematically illustrates a routine in the drive mode D to be executed by the switching vector selector 88. The routine is programmed to be repeatedly executed by the switching vector selector 88 (controller 50) every preset cycle.

Launching the routine, in step S180, the switching vector selector 88 determines whether the different current vector ΔI crosses a line parallel to the change vector Vc and passing thorough the zero point.

Upon determining that the different current vector ΔI does not cross the line, the switching vector selector 88 shifts to step S182. In step S182, the switching vector selector 88 determines whether the difference current vector ΔI increases out of the allowable range.

Upon determining that the difference current vector ΔI increases out of the allowable range (YES in step S182), the switching vector selector 88 determines whether the different current vector ΔI is located in the zero-vector output region of the α and β coordinate space in step S184 in the same manner as the step S130 of FIG. 15.

The condition of the affirmative determination in step 180 and that of the affirmative determination in step S184 provide a transition condition Tr7 from the drive mode D to the drive mode C illustrated in FIG. 14. The reason why it is suitable to shift the drive mode for the inverter IV from the drive mode D to the drive mode (zero vector mode) C is substantially identical to the reason shown in the descriptions of the operation in step S138.

When either the condition of the affirmative determination in step S180 or that of the affirmative determination in step S184 is met, the switching vector selector 88 shifts to step S186.

In step S186, the switching vector selector 88 shifts the drive mode for the inverter IV from the drive mode D to the drive mode C to thereby shift the inverter switching to one of the zero vectors.

Specifically, when the drive of the inverter IV in the drive mode D makes possible the drive mode for the inverter IV is shifted to the drive mode C (zero vector mode), changing the inverter switching to one of the zero vectors allows durations of the zero vectors and opportunities to update the change vector Vc to be ensured.

Otherwise, upon determining that the different current vector ΔI is not located in the zero-vector output region (NO in step S184), the switching vector selector 88 determines whether the first switching vector Sv1 defines one boundary of a region containing the change vector Vc in step S188.

Upon determining that the first switching vector Sv1 defines one boundary of the region containing the change vector Vc (YES in step S188), the switching vector selector 88 proceeds to step S190. In step S190, the switching vector selector 88 shifts the drive mode for the inverter IV from the drive mode D to the drive mode A to thereby shift the inverter switching to the first switching vector Sv1.

The condition of the affirmative determination in step S188 provides a transition condition Tr8 from the drive mode C to the drive mode A illustrated in FIG. 14.

Otherwise, upon determining that the first switching vector Sv1 does not define one boundary of the region containing the change vector Vc (NO in step S188), the switching vector selector 88 shifts to step S192. In step S192, the switching vector selector 88 maintains the drive mode D for the inverter IV, and updates the inverter switching to the latest first switching vector Sv1 outputted from the first switching vector selector 80.

The condition of the negative determination in step S188 provides a transition condition Tr9.

Otherwise, upon determining that the difference current vector ΔI does not increase out of the allowable range (NO in step S182), the switching vector selector 88 maintains the drive mode D for the inverter IV without updating the inverter switching in step S194.

When the operation in step S186, 5190, 5192, or 5194 is completed, the switching vector selector 88 terminates the routine in the drive mode D.

As described above, under steady state, the switching for the switching elements 12, 14, 16, 18, 20, and 22 is carried out in accordance with the switching pattern illustrated in FIG. 3, resulting in increasing durations of the inverter IV being driven in the zero vector mode as much as possible.

Even if the switching for the switching elements 12, 14, 16, 18, 20, and 22 goes out of the switching pattern illustrated in FIG. 3, it is possible to rapidly return the switching for the switching elements 12, 14, 16, 18, 20, and 22 to the switching pattern illustrated in FIG. 3.

Figure 20:
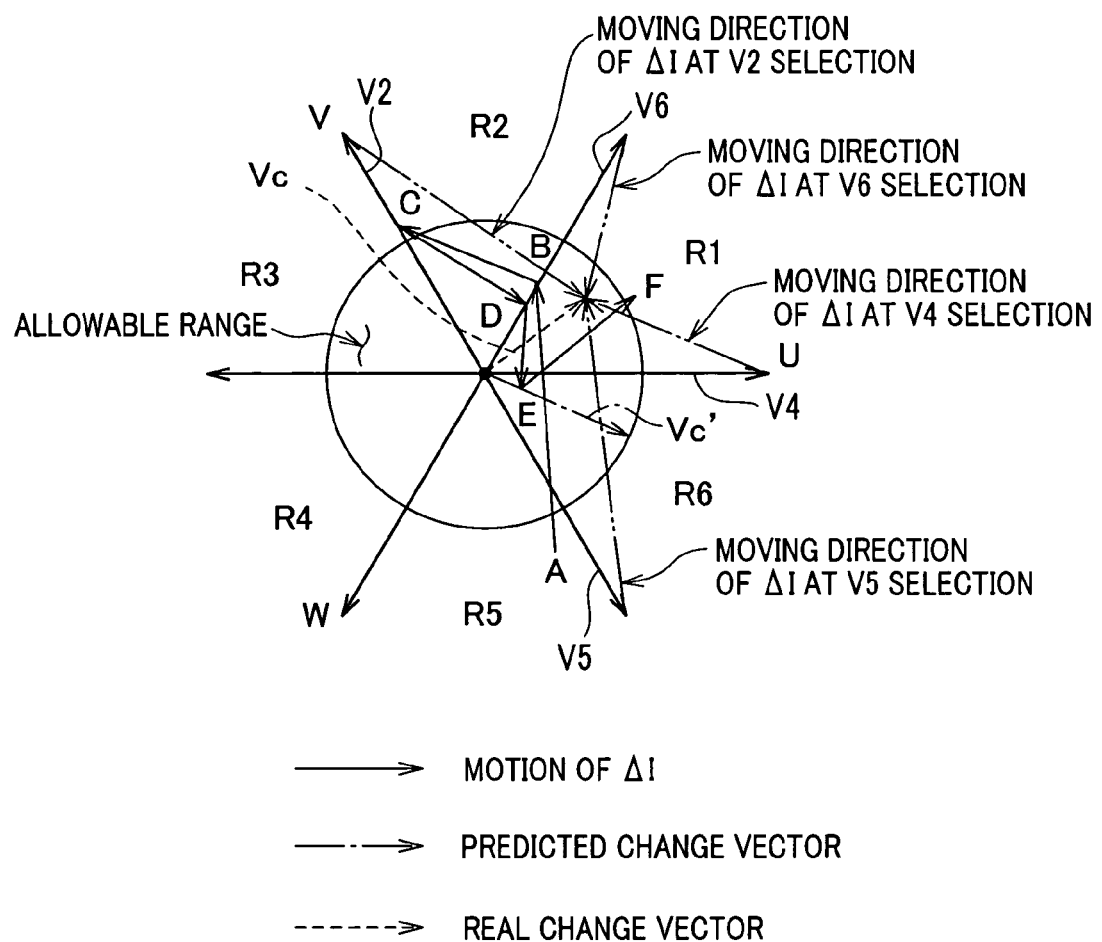
FIG. 20 is a vector diagram schematically illustrating operations of the controller under transient states according to the first embodiment.

FIG. 20 schematically illustrates operations of the controller 50 under transient states in which the direction of a predicted change vector Vc' based on the previous zero-vector durations and that of the present change vector Vc increases.

In FIG. 20, it is assumed that the predicted change vector Vc' is located in the region R6 and the difference value vector ΔI is located at a point A out of the circled allowable range in the α and β coordinate space.

Because the non-zero vector V5 is the closest to the difference value vector ΔI, the non-zero vector V5 is set to the first switching vector Sv1. The non-zero vector V5 defines one boundary of the region R6 containing the predicted change vector Vc' so that the drive mode for the inverter IV becomes the drive mode A. In the drive mode A, the switching state of the inverter IV is set to the non-zero vector V5 so that the different current vector ΔI changes in the direction of a differential vector obtained by subtracting the non-zero vector V5 from the real change vector Vc.

When the different current vector ΔI reaches a point B, because there are two times of region shift of the different current vector ΔI in the α and β coordinate space, the transition condition Tr1 is met (see YES in step S132 of FIG. 15), This shifts the driving of the inverter IV to the second switching vector Sv2 corresponding to the non-zero vector V4, resulting in that the different current vector ΔI changes in the direction of a differential vector obtained by subtracting the non-zero vector V4 from the real change vector Vc.

When the different current vector ΔI reaches a point C, the different current vector ΔI goes out of the allowable range without crossing the line. At that time, because the region R2 in which the point C lies is different from a region (zero-vector output region) through which the opposite direction of the predicted change vector Vc passes, the transition condition Tr5 is met (see YES in step S154 of FIG. 17). This shifts the drive mode for the inverter IV to the drive mode D. In the drive mode D, the switching mode (switching state) of the inverter IV is set to the non-zero vector V2 that is outputted from the first switching vector 80 as the first switching vector Sv1 because the non-zero vector V2 is the closest to the different current vector ΔI. This results in that the different current vector ΔI changes in the direction of a differential vector obtained by subtracting the non-zero vector V2 from the real change vector Vc.

At a point D, the transition condition Tr9 (see NO in step S188 of FIG. 19) updates the driving of the inverter IV to the non-zero vector V6 that is outputted from the first switching vector 80 as the first switching vector Sv1 because the non-zero vector V6 is the closest to the different current vector ΔI. The updated non-zero vector V6 as the first switching vector Sv1 allows the different current vector ΔI to change in the direction of a differential vector obtained by subtracting the non-zero vector V6 from the real change vector Vc.

At a point E, because the different current vector ΔI crosses the change vector Vc, the transition condition Tr7 is met (see YES in step S180 of FIG. 19). This shifts the drive mode for the inverter IV to the drive mode C so that the switching mode for the inverter IV is set to one of the zero vectors, resulting in that the different current vector ΔI changes in a direction parallel to the direction of the real change vector Vc (see the equation [c6]).

That is, it is possible to update the predicted change vector Vc' to the real change vector Vc.

When the different current vector ΔI reaches a point F out of the allowable range in the region R1, the non-zero vector V6 that is the closest to the different current vector ΔI is set to the first switching vector Sv1. The first switching vector Sv1 defines one boundary of the region R1 containing the real change vector Vc so that the drive mode for the inverter IV becomes the drive mode A.

Thereafter, the inverter IV is switched in accordance with the switching pattern illustrated in FIG. 3.

Figure 21:
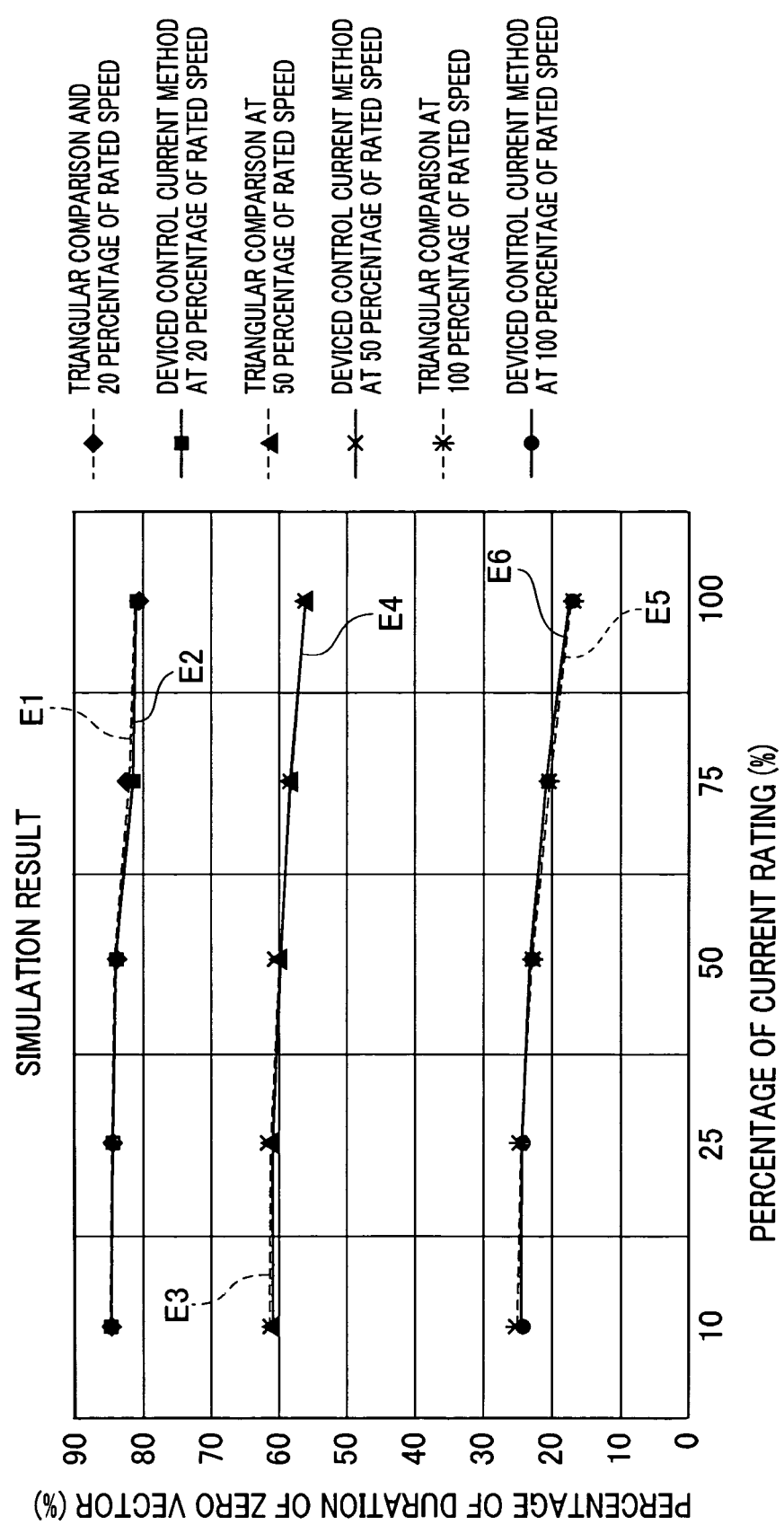
FIG. 21 is a graph schematically demonstrates simulation results of a current control method according to the first embodiment of the present invention.

FIG. 21 demonstrates simulation results of the current control method according to the first embodiment of the present invention. FIG. 21 shows:

a graph E1 indicative of a relationship between the percentage of durations of the zero vectors and the percentage of current rating when the inverter IV is driven based on a well-known triangular PWM control at the motor speed of 20 percentage of the rated speed;

a graph E2 indicative of a relationship between the percentage of durations of the zero vectors and the percentage of current rating when the inverter IV is driven based on the current control method according to the first embodiment at the motor speed of 20 percentage of the rated speed;

a graph E3 indicative of a relationship between the percentage of durations of the zero vectors and the percentage of current rating when the inverter IV is driven based on the well-known triangular PWM control at the motor speed of 50 percentage of the rated speed;

a graph E4 indicative of a relationship between the percentage of durations of the zero vectors and the percentage of current rating when the inverter IV is driven based on the current control method according to the first embodiment at the motor speed of 50 percentage of the rated speed;

a graph E5 indicative of a relationship between the percentage of durations of the zero vectors and the percentage of current rating when the inverter IV is driven based on the well-known triangular PWM control at the motor speed of 100 percentage of the rated speed; and a graph E6 indicative of a relationship between the percentage of durations of the zero vectors and the percentage of current rating when the inverter IV is driven based on the current control method according to the first embodiment at the motor speed of 100 percentage of the rated speed.

As clearly illustrated in FIG. 21, the current control method according to the first embodiment can use the zero vectors for driving the inverter IV at a percentage equivalent to a percentage of the zero vectors to be used for the well-known triangular PWM control during any operating range. The current control method probably reduces higher harmonic waves at least as well as do the well-known triangular PWM control.

According to the first embodiment of the present invention detailedly described hereinbefore, the control system 11 achieves the following first to nineteenth effects:

Specifically, the control system 11 is configured to set the driving of the inverter IV to one of the zero vectors when the difference value vector ΔI is located in a region through which the opposite direction of the change vector Vc passes.

This allows the different current vector ΔI to temporarily decrease and thereafter increase. Thus, the control system 11 achieves the first effect of increasing the duration of the different current vector ΔI remaining within the allowable range to thereby increase the duration of the inverter IV being driven in the zero vector mode.

In addition, because the different current vector ΔI is controlled to pass through its zero point, it is possible to set the actual current vector I to be higher than the command current vector Ic and lower than it without deviating, for a long period, the actual current vector I from the command current vector Ic to only the higher side or lower side. This increases the accuracy of controlling the torque to be created by the motor 10.

Regarding the second effect, under control of the different current vector ΔI within the allowable range, the duration for which the driving of the inverter IV can be set to one of the zero vectors depends on the magnitude of the different current vector ΔI.

Based on the dependency, changing the different current vector ΔI along a line, which is parallel to or contained in the change vector Vc and passes thorough the zero point, easily increases the duration of one of the zero vectors to be used. Thus, the control system 11 is configured to set the driving of the inverter IV to one of the zero vectors when the different current vector ΔI crosses the line. This configuration achieves the second effect of easily and properly increasing the duration of one of the zero vectors.

The control system 11 is equipped with means that controls the different current vector ΔI toward a region through which the opposite direction of the change vector Vc passes; this region is one of the six separated regions R1 to R6 defined by the six non-zero vectors V1 to V6. This permits, after the different current vector ΔI is controlled toward the region by the means, the driving of the inverter IV to be set to one of the zero vectors. This configuration achieves the third effect of effectively increasing the duration of one of the zero vectors.

When a non-zero voltage vector that is the closest to the different current vector ΔI defines one boundary of a region containing the change vector Vc, the control system 11 is configured to drive the inverter IV such that:

the non-zero voltage vector that is the closest to the different current vector ΔI is set to the first switching vector Sv1; and an alternative non-zero voltage vector that defines the other boundary of the region containing the change vector Vc is set to the second switching vector Sv2.

Specifically, when the switching mode for the driver IV is set to a non-zero vector, the different current vector ΔI probably changes in the direction of a differential vector obtained by subtracting the non-zero vector from change vector Vc. For this reason, as the fourth effect, the sequential use of the first and second switching vectors Sv1 and Sv2 that define the region containing the change vector Vc allows the different current vector ΔI to be shifted toward a region through which the opposite direction of the change vector Vc passes.

The control system 11 is configured to carry out switching from the first switching vector Sv1 to the second switching vector Sv2 when the different current vector ΔI is not located in a region through which the opposite direction of the change vector Vc passes and there are two times of region shift of the different current vector ΔI in the α and β coordinate space.

This allows, as the fifth effect, the different current vector ΔI to be properly controlled toward the region through which the opposite direction of the change vector Vc passes.

The control system 11 is configured to carry out switching from the first switching vector Sv1 to the second switching vector Sv2 when the different current vector ΔI is not located in a region through which the opposite direction of the change vector Vc passes and the different current vector ΔI increases out of the allowable range.

The increase in the different current vector ΔI out of the allowable range may represent that an unexpected matter appears during the inverter IV being driven in the switching pattern illustrated in FIG. 3.

The configuration however, even if there is an unexpected matter during the inverter IV being driven in the switching pattern illustrated in FIG. 3, achieves the sixth effect of improving the switching mode for the inverter IV.

Under the switching mode for the inverter IV being set to the second switching vector Sv2, when the different current vector ΔI crosses the line, which is parallel to or contained in the change vector Vc and passes thorough the zero point, the control system 11 is configured to set the switching mode for the inverter IV to one of the zero vectors.

As described above, changing the different current vector ΔI along the line, which is parallel to or contained in the change vector Vc and passes thorough the zero point, easily increases the duration of one of the zero vectors to be used.

For this reason, the configuration achieves the seventh effect of easily and properly increasing the duration of one of the zero vectors.

Under the switching mode for the inverter IV being set to the second switching vector Sv2, the control system 11 is configured to set the switching mode for the inverter IV to one of the zero vectors when the different current vector ΔI is located out of the allowable range and located in a region through which the opposite direction of the change vector Vc.

When the different current vector ΔI is located in the region through which the opposite direction of the change vector Vc, changing the switching mode for the inverter IV to one of the zero vectors allows the different current vector ΔI to change in the direction of the change vector Vc, thus easily ensuring the duration of one of the zero vectors remaining within the allowable range.

Therefore, the configuration achieves the eighth effect of increasing the duration one of the zero vectors as compared with setting the switching mode for the inverter IV to one of the zero vectors when the different current vector ΔI is located within the allowable range.

Under the switching mode for the inverter IV being set to the second switching vector Sv2, the control system 11 is configured to set the switching mode for the inverter IV to a non-zero vector that is the closest to the different current vector ΔI (see drive mode D) when the different current vector A is not located in a region through which the opposite direction of the change vector Vc and increases out of the allowable range.

Normally, the use of the non-zero vector that is the closest to the different current vector ΔI properly controls the different current vector ΔI within the allowable range.

Therefore, the configuration achieves the ninth effect of, even if an unexpected behavior of the different current vector ΔI appears for the inverter switching pattern illustrated in FIG. 3, controlling the different current vector ΔI to be within the allowable range.

Under the switching mode for the inverter IV being set to one of the zero vectors, the control system 11 is configured to set the switching mode for the inverter IV to a non-zero vector that is the closest to the different current vector ΔI (see drive mode D) when the different current vector ΔI increases out of the allowable range and the non-zero vector that is the closest to the different current vector ΔI does not define one boundary of a region containing the change vector Vc.

Normally, the use of the non-zero vector that is the closest to the different current vector ΔI properly controls the different current vector ΔI within the allowable range.

Therefore, the configuration achieves the tenth effect of, even if an unexpected behavior of the different current vector ΔI appears for the inverter switching pattern illustrated in FIG. 3, controlling the different current vector ΔI to be within the allowable range.

During the inverter being driven in the drive mode D, when a non-zero vector that is the closest to the different current vector ΔI does not define one boundary of a region containing the change vector Vc and the different current vector ΔI does not lie in a zero-vector output region, the control system 11 is configured to update the switching mode for the inverter IV to the non-zero vector that is the closest to the different current vector ΔI.

Normally, the use of the non-zero vector that is the closest to the different current vector ΔI properly controls the different current vector ΔI within the allowable range.

Therefore, the configuration achieves the eleventh effect of, even if the present switching mode for the inverter may be improper for control of the different current vector ΔI within the allowable range, properly addressing the improper switching mode for the inverter.

During the inverter being driven in the drive mode D, when the different current vector ΔI crosses a line parallel to or contained in the change vector Vc, the control system 11 is configured to set the switching mode for the inverter IV to one of the zero vectors.

This achieves the twelfth effect of setting the switching mode for the inverter IV to one of the zero vectors at a proper timing.

During the inverter being driven in the drive mode D, when the different current vector ΔI lies within a region through which the opposite direction of the change vector Vc passes while increasing out of the allowable range, the control system 11 is configured to set the switching mode for the inverter IV to one of the zero vectors.

This achieves the thirteenth effect of setting the switching mode for the inverter IV to one of the zero vectors at a proper timing.

Under the switching mode for the inverter IV being set to the first switching vector Sv1, when the different current vector ΔI lies within a region through which the opposite direction of the change vector Vc passes, and crosses the line parallel to or contained in the change vector Vc, the control system 11 is configured to set the switching mode for the inverter IV to one of the zero vectors.

This achieves the fourteenth effect of increasing time until the different current vector ΔI goes out of the allowable range from the region through which the opposite direction of the change vector Vc passes.

Under the switching mode for the inverter IV being set to the first switching vector Sv1, when the different current vector ΔI lies within a region through which the opposite direction of the change vector Vc passes, and increases out of the allowable range, the control system 11 is configured to set the switching mode for the inverter IV to one of the zero vectors.

This achieves the fifteenth effect of increasing time until the different current vector ΔI goes out of the allowable range from the region through which the opposite direction of the change vector Vc passes.

The control system 11 is configured to narrow a search to two non-zero vectors that may be the closest to the different current vector ΔI based on the sings of the respective components of the different current vector ΔI. Thereafter, the control system 11 is configured to compute the inner product of the different current vector ΔI and each of the two non-zero vectors to thereby identify, as the first switching vector Sv1, one of the two non-zero vectors that is the closest to the different current vector ΔI based on a result of the inner product.

This achieves the sixteenth effect of obtaining the first switching vector Sv1 with comparatively simple operations. Particularly, narrowing, initially, a search to two non-zero vectors that may be the closest to the different current vector ΔI allows the operations to be more simple as compared with performing operations of computing the inner product of the different current vector ΔI and each of all of the non-zero vectors.

The control system 11 is configured to narrow a search to two regions that may contain the different current vector ΔI based on the sings of the respective components of the different current vector ΔI. Thereafter, the control system 11 is configured to compute the inner product of the different current vector ΔI and each of two non-zero vectors selected from all of the non-zero vectors; these two non-zero vectors define the identified two regions and are not shared with each other.

This achieves the seventeenth effect of identifying one of the two non-zero vectors that contains the different current vector ΔI based on a result of the inner product with comparatively simple operations.

The control system 11 is configured to narrow a search to two regions that may contain the change vector Vc based on the sings of the respective components of the change vector Vc. Thereafter, the control system 11 is configured to compute the inner product of the different current vector ΔI and each of two non-zero vectors selected from all of the non-zero vectors; these two non-zero vectors define the identified two regions and are not shared with each other.

This achieves the eighteenth effect of identifying one of the two non-zero vectors that contains the change vector Vc based on a result of the inner product with comparatively simple operations.

The control system 11 is configured to predict the change vector Vc during a zero vector mode that will be ended at a subsequent routine based on the changed values of the different current vector ΔI during a corresponding zero vector mode that is ended at the present routine.

This achieves the nineteenth effect of easily and properly predicting the change vector Vc.

Second Embodiment

A control system according to a second embodiment of the present invention will be described hereinafter with reference to FIG. 22.

The structure of the control system according to the second embodiment is substantially identical to that of the control system 11 according to the first embodiment. So, like parts between the control systems according to the first and second embodiments, to which like reference characters are assigned, are omitted or simplified in description.

Figure 22:
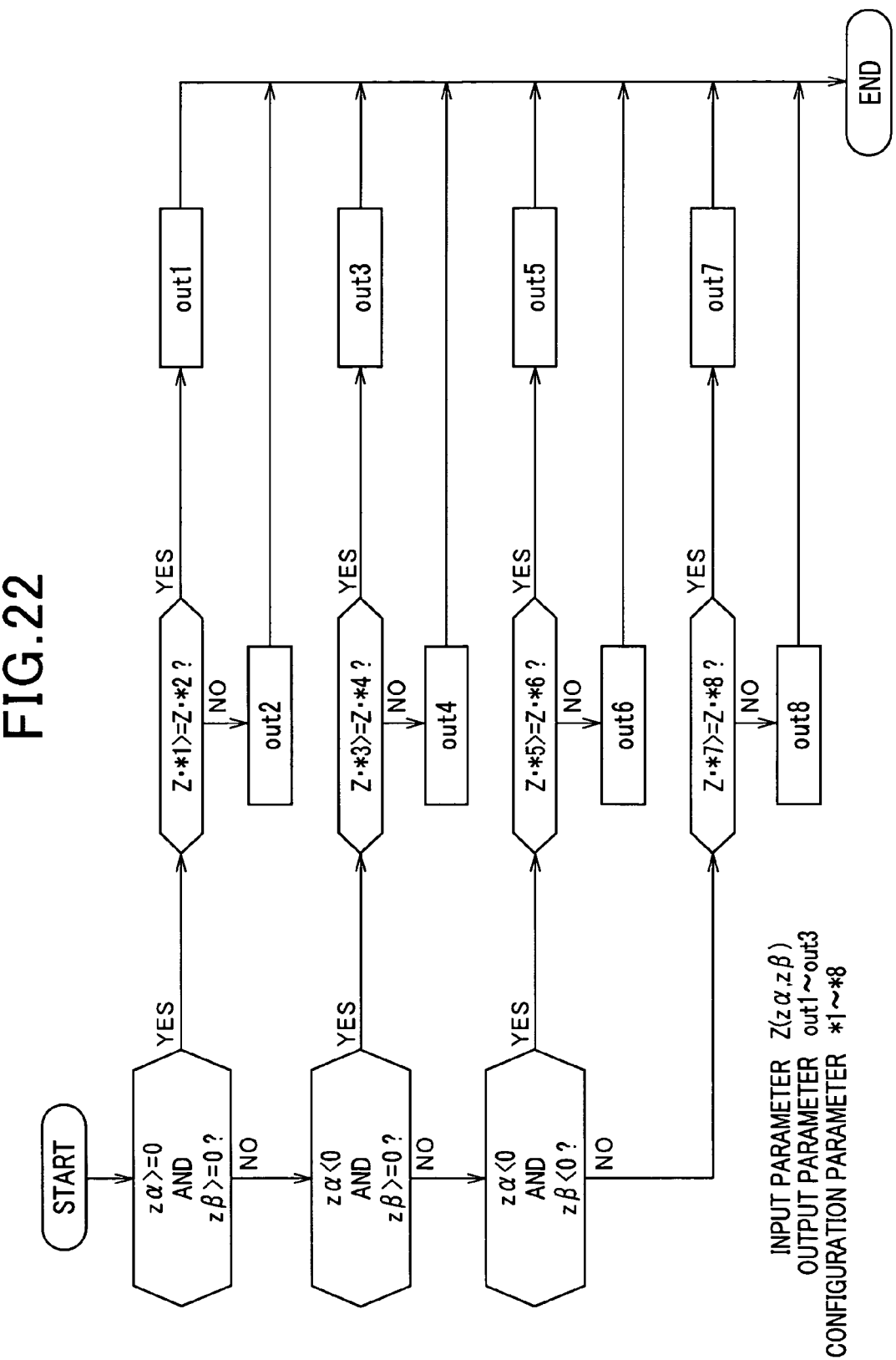
FIG. 22 is a flowchart schematically illustrating a common logic function shared by modules 80, 82, and 84 illustrated in FIG. 4 according to a second embodiment of the present invention.

Referring to FIG. 4, each of the modules 80, 82, and 84 according to the second embodiment includes a common logic function illustrated in FIG. 22.

Specifically, as can be seen from the comparison between the respective routines illustrated in FIGS. 7, 8, and 11, the logic structures of the respective routines illustrated in FIGS. 7, 8, and 11 are identical to each other. In other words, each of the routines illustrated in FIGS. 7, 8, and 11 has a common logic structure, individual vectors with components whose signs are to be checked, individual vectors to be subject to the inner product, and individual outputs.

For this reason, the common logic function is programmed such that the parameters as arguments are switched for the respective routines to be passed thereto. This common logic function can implement the routines illustrated in FIGS. 7, 8, and 11.

Specifically, the common logic function has input parameters Z (zα, zβ), output parameters out1 to out 8, and configuration parameters *1 to *8, For example, arguments of ΔIα and ΔIβ are passed as the input parameters to the single logic function, arguments of V4, V6, V3, V2, V3, V1, V4, and V5 are passed as the output parameters to the single logic function, and arguments of V4, V6, V3, V2, V3, V1, V4, and V5 are passed as the configuration parameters *1 to *8 to the single logic function. This allows the common logic function to carry out the first switching-vector selecting routine.

As described above, the control system according to the second embodiment is configured to implement the first switching-vector selecting routine illustrated in FIG. 7, the region identifying routine illustrated in FIG. 8, and the region identifying subroutine illustrated in FIG. 11 with the use of the single logic function illustrated in FIG. 22. This achieves the twentieth effect, in addition to the first to nineteenth effects, of simplifying the functional structure of the controller 50.

The first and second embodiments can be modified as follows.

In the first and second embodiments, the transition condition Tr3 to the drive mode A under steady state is the affirmative determination of whether the first switching vector Sv1 defines one boundary of a region containing the change vector Vc, but the present invention is not limited to the structure. Specifically, the transition condition Tr3 can include, in addition to such an affirmative determination, a condition that the difference current vector ΔI lies within the same region as the region containing the change vector Vc.

In the first and second embodiments, the transition condition Tr2 from the drive mode B for outputting the second switching vector Sv2 to the drive mode C for outputting one of the zero vectors includes the affirmative determination in step S150 and the affirmative determination in step S154, but the present invention is not limited to the structure. Specifically, the transition condition Tr2 can include, in place of the affirmative determination in step S150, a condition that the difference current vector ΔI increases out of the allowable range or lies out of the allowable range.

In the first and second embodiments, the transition condition Tr4 from the drive mode A for outputting the first switching vector Sv1 to the drive mode C for outputting one of the zero vectors includes a condition that there are two times of region shift of the different current vector ΔI in the α and β coordinate space (see step S136 of FIG. 15), but such a condition can be eliminated.

As means for controlling the difference between a current actually flowing in a rotary machine and a command value for the current such that the difference is shifted to a region through which the opposite direction of a predicted change direction of the difference passes, the switching pattern illustrated in FIG. 3 is used to switch the voltage vectors to be applied to the rotary machine. The present invention is however not limited to the structure.

Figure 23:
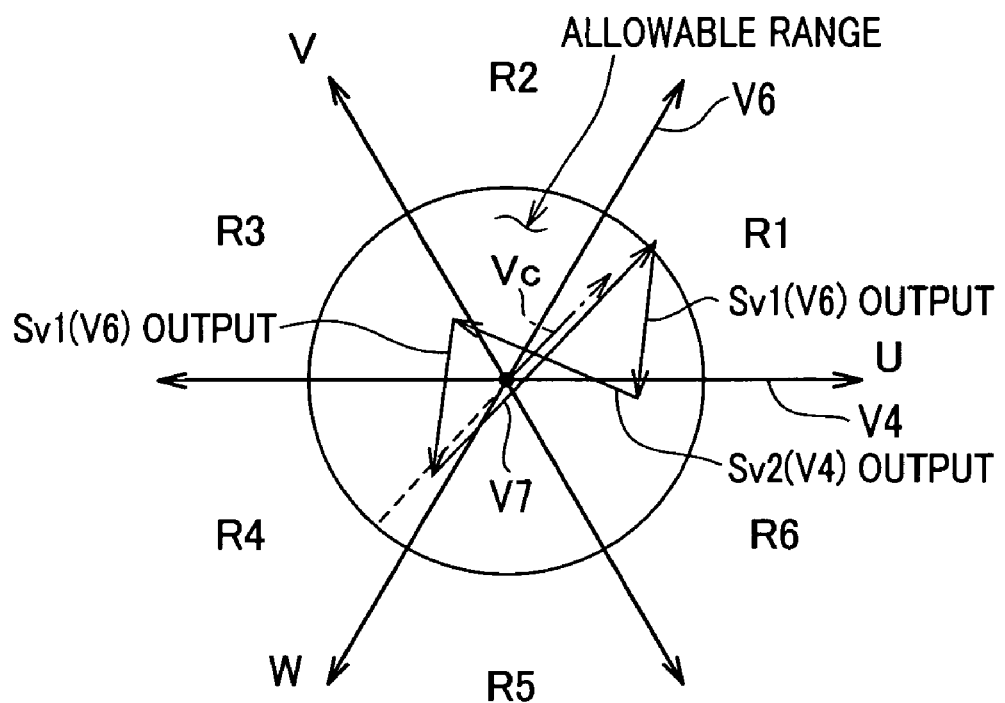
FIG. 23 is a vector diagram schematically illustrating a transient-state control method for currents to be supplied to the motor in view of current control principles according to a modification of the first embodiment.

Specifically, during the drive mode A, the switching pattern illustrated in FIG. 23 can be used to switch the voltage vectors to be applied to the motor 10.

Referring to FIG. 23, it is assumed that the change vector Vc and the difference value vector ΔI are located in the region R1 with the difference value vector ΔI being out of the allowable range.

In FIG. 23, the voltage vector V6 is referred to as the first switching vector Sv1, and the voltage vector V4 is referred to as the second switching vector Sv2. The drive mode for the inverter IV is switched in the following order.

First, the inverter IV is controlled to be driven in the mode of the first switching vector Sv1. This allows the different current vector ΔI to change in the direction of a differential vector obtained by subtracting the first switching vector Sv1 from the change vector Vc (see "Sv1 (V6) OUTPUT" in FIG. 23).

Second, when there is one time of region shift of the different current vector ΔI in the α and β coordinate space, the inverter IV is controlled to be driven in the mode of the second switching vector Sv2. That is, in FIG. 3, when the different current vector ΔI is shifted from the region R1 to the region R6, the drive mode for the inverter IV is shifted from the mode of the first switching vector Sv1 to the mode of the second switching vector Sv2 (see "Sv2 (V4) OUTPUT" in FIG. 23).

This allows the different current vector ΔI to change in a direction of a differential vector obtained by subtracting the second switching vector Sv2 from the change vector Vc (see "Sv2 (V4) OUTPUT" in FIG. 23).

Third, when the different current vector ΔI enters into the region R3 symmetrical about the zero point from the region R6, the inverter IV is controlled to be driven in the mode of the first switching vector Sv1. That is, in FIG. 23, when the different current vector ΔI is shifted from the region R2 to the region R3, the drive mode for the inverter IV is shifted from the mode of the second switching vector S2 to the mode of the first switching vector Sv1 (see "Sv1 (V6) OUTPUT" in FIG. 23).

This allows the different current vector ΔI to change in a direction of a differential vector obtained by subtracting the first switching vector Sv1 from the change vector Vc.

Fourth, when the different current vector ΔI crosses a line, which is parallel to or contained in the change vector Vc and passes thorough a point at which the different current vector ΔI is zero, the drive mode for the inverter IV is shifted from the mode of the first switching vector Sv1 to the zero vector mode of the zero vector V7.

This allows the different current vector ΔI to temporarily decrease until the zero point and thereafter increase.

With the switching pattern illustrated in FIG. 23, each switching between voltage vectors in the order of V6, V4, V6, and V7 can be carried out by switching one pair of switching elements merely for a corresponding one phase at a time. This reduces surges due to each switching.

As means for controlling the difference between a current actually flowing in a rotary machine and a command value for the current such that the difference is shifted to a region through which the opposite direction of a predicted change direction of the difference passes, the switching pattern illustrated in FIG. 3 is used to switch the voltage vectors. The present invention is however not limited to the structure.

Specifically, feedback control means for controlling the difference between a feedback current actually flowing in a rotary machine and a command value for the current such that the difference is shifted to a region through which the opposite direction of a predicted change direction of the difference passes can be used without using specific switching patterns. In this modification, the control system can be equipped with zero vector outputting means for setting the switching of the inverter IV to a zero vector when the difference lies in the opposite direction of the predicted change direction or the difference crosses a line that extends in the predicted change direction and its opposite direction. This increases the durations of the zero vectors.

Under normal instantaneous current control without using such difference control means, the control system can be equipped with zero vector outputting means. The zero vector outputting means is designed to set the switching of the inverter IV to a zero vector when the difference lies in the opposite direction of the predicted change direction or the difference crosses a line that extends in the predicted change direction and its opposite direction. This increases the durations of the zero vectors.

In the first and second embodiments, the controller 50 carries out various operations set forth above using the difference value vector ΔI. The present invention is however not limited to the structure.

Specifically, an alternative difference value vector calculated by subtracting the command current values iαc and iβc from the respective actual current values iα and iβ can be used in place of the difference value vector ΔI. In this modification, as the first switching vector Sv1, a non-zero vector opposite to an alternative non-zero vector that is the closest to the alternative difference value vector is required to be used. Similarly, in this modification, as the second switching vector Sv2, a non-zero vector opposite to an alternative non-zero vector that is the second closest to the alternative difference value vector is required to be used.

Means for estimating a change direction of the difference between a current actually flowing in a rotary machine and a command value for the current during the inverter IV being driven in the zero-vector mode is not limited to that described in the first and second embodiments.

Specifically, in accordance with the equation "Vc=L/(dIc/dt)+R·Ic+E−R·ΔI", the change vector Vc can be estimated based on the inductance L and the induced voltage E. In this case, the term "R·ΔI" can be neglected so that the voltage vector Vc can be used as a command voltage vector.

In addition, during low-RPM control for the motor 10, the term of the induced voltage becomes predominant in the equation [c5]. For this reason, the change vector Vc can be estimated based on only the induced voltage E. Note that, in order to set the change vector Vc to be suitable during high-RPM control for the motor 10, it is desirable such that the change vector Vc includes vector components due to the command current.

In the first and second embodiments, the allowable range is defined as a circled region about the center point in the α and β coordinate space at which the different current vector ΔI is zero, but the present invention is not limited to the structure. Specifically, the allowable range can be defined as a hexagonal region about the center point in the α and β coordinate space at which the different current vector ΔI is zero in order to set the difference within a predetermined threshold range.

Various types of rotary machines, such as power generators can be used in place of the motor 10.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A control system designed to use a plurality of voltage vectors expressing a switching mode for a switching circuit to thereby control a difference between a current actually flowing in a multiphase rotary machine and a command current value therefore within an allowable range, the plurality of voltage vectors including a zero vector that allows line-to-line voltages in the multiphase rotary machine to be all zero, and a plurality of non-zero vectors that allow at least one of line-to-line voltage in the multiphase rotary machine to be nonzero, the plurality of non-zero vectors defining a plurality of separated regions in a space around a center point at which the difference is zero, the control system comprising
 a calculating unit configured to calculate a direction of change in the difference during the switching mode for the switching circuit being set to the zero vector; and
 a zero-vector setting unit configured to set the switching mode for the switching circuit to the zero vector when a preset positional condition between the difference and the direction of change in the difference is met in the space.

2. The control system according to claim 1, wherein the preset positional condition includes a condition in which the difference is located in one of the plurality of regions, a direction opposite to the direction of change in the difference passing through the one of the plurality of regions.

3. The control system according to claim 2, wherein the preset positional condition includes a condition in which the difference crosses a line, the line extending from the center point in the direction of change in the difference and the opposite direction thereto.

4. The control system according to claim 1, wherein the preset positional condition includes a condition in which the difference crosses a line, the line extending from the center point in the direction of change in the difference and a direction opposite thereto.

5. The control system according to claim 1, further comprising:
 a difference control unit configured to:
 receive the difference and the direction of change in the difference; and
 control the difference such that the difference is shifted to one of the plurality of regions, a direction opposite to the direction of change in the difference passing through the one of the plurality of regions.

6. The control system according to claim 5, wherein the difference is obtained by subtracting the current actually flowing in the rotary machine from the command current value, and the difference control unit is configured to:
 when the difference is located out of the allowable range and one of the non-zero vectors that is the closest to the difference defines one boundary of one of the plurality of regions, set the one of the non-zero vectors that is the closest to the difference to a first switching vector, the one of the plurality of regions containing a vector of the difference from the center point;
 set, to a second switching vector, an alternative one of the plurality of non-zero vectors that defines the other boundary of the one of the plurality of regions containing the vector of the difference; and
 drive the switching circuit with the switching mode being set to the first switching vector, and thereafter drive the switching circuit with the switching mode being shifted to the second switching vector.

7. The control system according to claim 6, wherein the difference control unit is configured to shift the switching mode for the switching circuit from the first switching vector to the second switching vector when the difference is not located in the one of the plurality of regions and there are two times of region shift of the difference, the direction opposite to the direction of change in the difference passing through the one of the plurality of regions.

8. The control system according to claim 6, wherein the difference control unit is configured to shift the switching mode for the switching circuit from the first switching vector to the second switching vector when the difference is not located in the one of the plurality of regions and the difference increases out of the allowable range, the direction opposite to the direction of change in the difference passing through the one of the plurality of regions.

9. The control system according to claim 6, wherein the zero vector setting unit is configured to, under the switching mode for the switching circuit being set to the second switching vector by the difference control unit, shift the switching mode for the switching circuit to the zero vector when the difference crosses a line, the line extending from the center point in the direction of change in the difference and the opposite direction thereto.

10. The control system according to claim 6, wherein the zero vector setting unit is configured to, under the switching mode for the switching circuit being set to the second switching vector by the difference control unit, shift the switching mode for the switching circuit to the zero vector when the difference is located out of the allowable range and in one of the plurality of regions, the direction opposite to the direction of change in the difference passing through the one of the plurality of regions.

11. The control system according to claim 6, further comprising:
 a transient control unit configured to, under the switching mode for the switching circuit being set to one of the second switching vector and the zero vector by the difference control unit, set the switching mode for the switching circuit to one of the plurality of non-zero vectors that is the closest to the difference when a preset positional transient condition between the difference and the direction of change in the difference is met in the space.

12. The control system according to claim 11, wherein, under the switching mode for the switching circuit being set to the second switching vector, the transient control unit is configured to set the switching mode for the switching circuit to the one of the plurality of non-zero vectors that is the closest to the difference when, as the preset positional transient condition, the difference is located out of the allowable range in the one of the plurality of regions while increasing, the direction opposite to the direction of change in the difference passing through the one of the plurality of regions.

13. The control system according to claim 11, wherein, under the switching mode for the switching circuit being set to the zero vector, the transient control unit is configured to set the switching mode for the switching circuit to the one of the plurality of non-zero vectors that is the closest to the difference when, as the preset positional transient condition, the difference increases out of the allowable range, and the one of the plurality of non-zero vectors that is the closest to the difference does not define one boundary of the one of the plurality of regions that contains the vector of the difference from the center point.

14. The control system according to claim 11, wherein the transient control unit is configured to update the switching mode for the switching circuit to the one of the plurality of non-zero vectors that is the closest to an actual value of the difference when:
 the one of the plurality of non-zero vectors that is the closest to the difference does not define one boundary of the one of the plurality of regions that contains the vector of the difference from the center point;

the difference is not located in the one of the plurality of regions, the direction opposite to the direction of change in the difference passing through the one of the plurality of regions; and the difference increases out of the allowable range.

15. The control system according to claim 11, wherein the zero vector setting unit is configured to, under the switching mode for the switching circuit being controlled by the transient control unit, shift the switching mode for the switching circuit to the zero vector when the difference crosses a line, the line extending from the center point in the direction of change in the difference and the opposite direction thereto.

16. The control system according to claim 11, wherein the zero vector setting unit is configured to, under the switching mode for the switching circuit being controlled by the transient control unit, shift the switching mode for the switching circuit to the zero vector when the difference is located in the one of the plurality of regions and increases, the direction opposite to the direction of change in the difference passing through the one of the plurality of regions.

17. The control system according to claim 6, wherein the zero vector setting unit is configured to, under the switching mode for the switching circuit being set to the first switching vector by the difference control unit, shift the switching mode for the switching circuit to the zero vector when the difference is located in the one of the plurality of regions and crosses a line, the direction opposite to the direction of change in the difference passing through the one of the plurality of regions, the line extending from the center point in the direction of change in the difference and the opposite direction thereto.

18. The control system according to claim 6, wherein the zero vector setting unit is configured to, under the switching mode for the switching circuit being set to the first switching vector by the difference control unit, shift the switching mode for the switching circuit to the zero vector when the difference is located out of the allowable range and in the one of the plurality of regions and increases, the direction opposite to the direction of change in the difference passing through the one of the plurality of regions.

19. The control system according to claim 6, wherein the difference control unit comprises an identifying unit configured to:

calculate a first inner product of the vector of the difference and a first non-zero vector included in the plurality of non-zero vectors;

calculate a second inner product of the vector of the difference and a second non-zero vector included in the plurality of non-zero vectors; the first and second non-zero vectors separating the one of the plurality of regions containing the vector of the difference; and compare the first inner product with the second inner product to thereby identify, as the first switching vector, any one of the first and second non-zero vectors based on a result of the comparison.

20. The control system according to claim 6, further comprising:

a determination unit configured to:

calculate a first inner product of the vector of the difference and a first non-zero vector included in the plurality of non-zero vectors;

calculate a second inner product of the vector of the difference and a second non-zero vector included in the plurality of non-zero vectors; the first and second non-zero vectors separating a set of adjacent two regions included in the plurality of regions and containing the vector of the difference; and compare the first inner product with the second inner product to thereby identify one of the adjacent two regions that contains the vector of the difference based on a result of the comparison.

21. The control system according to claim 6, further comprising:

a determination unit configured to:

calculate a first inner product of a vector of the direction of change in the difference and a first non-zero vector included in the plurality of non-zero vectors;

calculate a second inner product of the vector of the direction of change in the difference and a second non-zero vector included in the plurality of non-zero vectors; the first and second non-zero vectors separating a set of adjacent two regions included in the plurality of regions and containing the vector of the difference; and compare the first inner product with the second inner product to thereby identify one of the adjacent two regions that contains the vector of the direction of change in the difference based on a result of the comparison.

22. The control system according to claim 6, further comprising:

an identifying unit configured to:

calculate a first inner product of the vector of the difference and a first non-zero vector included in the plurality of non-zero vectors;

calculate a second inner product of the vector of the difference and a second non-zero vector included in the plurality of non-zero vectors; the first and second non-zero vectors separating the one of the plurality of regions containing the vector of the difference; and compare the first inner product with the second inner product to thereby identify, as the first switching vector, any one of the first and second non-zero vectors based on a result of the comparison and signs of components of the vector of the difference;

a first determining unit configured to:

calculate a third inner product of the vector of the difference and a third non-zero vector included in the plurality of non-zero vectors;

calculate a fourth inner product of the vector of the difference and a fourth non-zero vector included in the plurality of non-zero vectors, the third and fourth non-zero vectors separating a set of adjacent two regions included in the plurality of regions and containing the vector of the difference; and compare the third inner product with the fourth inner product to thereby identify one of the adjacent two regions that contains the vector of the difference based on a result of the comparison and sign of components of the vector of the difference; and a second determining unit configured to:

calculate a fifth inner product of a vector of the direction of change in the difference and a fifth non-zero vector included in the plurality of non-zero vectors;

calculate a sixth inner product of the vector of the direction of change in the difference and a sixth non-zero vector included in the plurality of non-zero vectors, the fifth and sixth non-zero vectors separating a set of adjacent two regions included in the plurality of regions and containing the vector of the difference; and compare the fifth inner product with the sixth inner product to thereby identify one of the adjacent two regions that contains the vector of the direction of change in the difference based on a result of the comparison and signs of components of the vector of the direction of change in the difference, wherein each of the identifying unit, the first determining unit, and the second determining unit comprises a common logic function, and is configured to individually pass, as arguments, a corresponding vector to be used as the inner product, a corresponding vector to be used as the signs of the components, and corresponding output parameters to the common logic function.

23. The control system according to claim 1, wherein the calculating unit comprises:

a measuring unit configured to measure a value indicative of the direction of change in the difference during the switching mode for the switching circuit being set to the zero vector every time the switching mode for the switching circuit is set to the zero vector; and a predicting unit configured to predict, based on the measured value, the direction of change in the difference after next time the switching mode for the switching circuit is set to the zero vector.

* * * * *